(12) United States Patent
Huang et al.

(10) Patent No.: US 9,423,917 B2
(45) Date of Patent: Aug. 23, 2016

(54) CAPACITIVE TOUCH PANEL

(71) Applicant: TPK Touch Solutions Inc., Taipei (TW)

(72) Inventors: Ming-Hsiang Huang, Zhongli (TW); Chun-Jung Huang, Zhongli (TW)

(73) Assignee: TPK Touch Solutions Inc., Taipei (TW)

( * ) Notice: Subject to any disclaimer, the term of this patent is extended or adjusted under 35 U.S.C. 154(b) by 183 days.

(21) Appl. No.: 14/468,102

(22) Filed: Aug. 25, 2014

(65) Prior Publication Data

US 2015/0068882 A1 Mar. 12, 2015

(30) Foreign Application Priority Data

Sep. 6, 2013 (CN) .......................... 2013 1 0403572

(51) Int. Cl.
*H03K 17/96* (2006.01)
*G06F 3/044* (2006.01)

(52) U.S. Cl.
CPC ..................................... *G06F 3/044* (2013.01)

(58) Field of Classification Search
CPC ...... H03K 17/96; H01H 1/029; G06F 3/044; G02F 1/1335
USPC .................................. 200/5 R, 600; 345/174
See application file for complete search history.

(56) References Cited

U.S. PATENT DOCUMENTS

2012/0199464 A1* 8/2012 Kim ........................ G06F 3/044 200/600
2013/0068603 A1* 3/2013 Kwak ..................... G06F 3/041 200/600
2013/0213789 A1* 8/2013 Fan .......................... G06F 3/044 200/600

* cited by examiner

*Primary Examiner* — Edwin A. Leon
*Assistant Examiner* — Iman Malakooti
(74) *Attorney, Agent, or Firm* — Gokalp Beyramoglu; Paul Bendemire

(57) ABSTRACT

A capacitive touch panel includes a first transparent substrate, a second transparent substrate, and an isolation layer. First and second sensing electrode serials are disposed on surfaces of the first and second transparent substrates, respectively. The first sensing electrode serials are formed by cascading first sensing electrodes. A first hollow region is formed between two adjacent first sensing electrodes. A first compensating electrode is formed in the first hollow region on the surface of the first transparent substrate. The second sensing electrode serials are formed by cascading second sensing electrodes. A second hollow region is formed between two adjacent second sensing electrodes. A second compensating electrode is formed in the second hollow region on the surface of the second transparent substrate. The isolation layer is disposed between the first and second transparent substrates.

13 Claims, 23 Drawing Sheets

CAPACITIVE TOUCH PANEL

BACKGROUND OF THE INVENTION

This Application claims priority of China Patent Application No.CN 201310403572.X, filed on Sep. 6, 2013, and the entirety of which is incorporated by reference herein.

FIELD OF THE INVENTION

The disclosure generally relates to a touch panel, and more particularly, relates to a capacitive touch panel.

DESCRIPTION OF THE RELATED ART

Nowadays, with the progress of touch-control technology, touch panels are widely used in portable devices, such as smart phones, PDAs (Personal Digital Assistants), tablet computers, and notebook computers. The portable devices may even include desktop information devices and their peripheral devices, such as AIO (All-In-One) desktop computers and touch display devices, and those are becoming more general and more popular in markets.

A conventional capacitive touch panel, as shown in FIG. 1 and FIG. 2, includes a first transparent substrate 10, a second transparent substrate 20, and an isolation layer 30. Multiple first sensing electrode serials 12 are disposed on a surface of the first transparent substrate 10. Similarly, multiple second sensing electrode serials 22 are disposed on a surface of the second transparent substrate 20. A first sensing electrode 14 in the X-axis of the capacitive touch panel and a second sensing electrode 24 in the Y-axis of the capacitive touch panel are formed by them, respectively. The first sensing electrode serial 12 and the second sensing electrode serial 22 are respectively formed by cascading multiple first sensing electrodes 14 and cascading multiple second sensing electrodes 24. The isolation layer 30 is configured to attach the first transparent substrate 10 to the second transparent substrate 20 and separate the first sensing electrodes 14 from the second sensing electrodes 24. The first sensing electrodes 14 and the second sensing electrodes 24 are usually made of transparent conductive materials, such as ITO (Indium Tin Oxide), and formed on the first transparent substrate 10 and the second transparent substrate 20 through etching, printing, and sputtering processes. As a result, a first hollow region 16 and a second hollow region 26 are respectively formed on the clearance surface regions of the first transparent substrate 10 and the second transparent substrate 20, in which the clearance regions have no transparent conductive materials.

Therefore, when light is transmitted to the conventional capacitive touch panel (e.g., the light emitted from a display panel below the touch panel), it passes through different interface materials of different regions on the panel surface. For example, the first transparent substrate 10, the second transparent substrate 20, the first sensing electrode 14, the second sensing electrode 24, and the isolation layer 30 have different refractive indexes due to their non-uniform materials and thicknesses. The light may just pass through either the first sensing electrode 14 or the second sensing electrode 24 in some regions on the surface of the capacitive touch panel, but the light may pass through both the first sensing electrode 14 and the second sensing electrode 24 in other regions on the surface of the capacitive touch panel. Since these different materials with different thicknesses provide non-uniform refractive indexes, the light is affected by the non-uniform refractive indexes when passing through different regions on the capacitive touch panel. As a result, the light may be refracted or reflected, and a user may see the pattern caused by the first sensing electrode 14 or the second sensing electrode 24 on the surface of the capacitive touch panel. The capacitive touch panel therefore has low light transmittance and poor optical performance.

BRIEF SUMMARY OF THE INVENTION

In the prior art, a conventional capacitive touch panel is affected by different refraction indexes of a variety of interface materials when light is transmitted through it. Therefore, its sensing electrodes tend to emerge on the surface of the capacitive touch panel. In addition, since a variety of regions on the capacitive touch panel are respectively affected by different refraction indexes of the interface materials, these regions of the capacitive touch panel have different light transmittances. As a result, the brightness is non-uniform on the surface of the capacitive touch panel. To be brief, the conventional capacitive touch panel often has the drawback of poor optical performance.

The invention is aimed to provide a capacitive touch panel, in which first and second compensating electrodes are disposed in first and second hollow regions of first and second transparent substrates, respectively, and no first and second sensing electrodes are disposed in the first and second hollow regions, respectively. The covering area, in which the first and second compensating electrodes are arranged to cover the first and second hollow regions, is adjusted appropriately according to the materials and thickness of the interfaces of the capacitive touch panel. In such a manner, the patterns of the sensing electrodes will not tend to emerge on the surface of the capacitive touch panel, and the capacitive touch panel will not tend to have non-uniform light transmittances.

In one exemplary embodiment, the disclosure is directed to a capacitive touch panel, comprising: a first transparent substrate, wherein a plurality of first sensing electrode serials are disposed in a first direction on a surface of the first transparent substrate, the first sensing electrode serials are formed by cascading a plurality of first sensing electrodes, a first hollow region is formed between two adjacent first sensing electrodes, and a first compensating electrode is formed in the first hollow region on the surface of the first transparent substrate; a second transparent substrate, wherein a plurality of second sensing electrode serials are disposed in a second direction on a surface of the second transparent substrate, the second sensing electrode serials are formed by cascading a plurality of second sensing electrodes, a second hollow region is formed between two adjacent second sensing electrodes, the second direction is perpendicular to the first direction, a second compensating electrode is formed in the second hollow region on the surface of the second transparent substrate, and a partition region is arranged between the first sensing electrodes and the second sensing electrodes adjacent thereto; and an isolation layer, disposed between the first transparent substrate and the second transparent substrate, configured to attach the first transparent substrate to the second transparent substrate, and configured to separate the first sensing electrodes from the second sensing electrodes.

In another embodiment, the disclosure is directed to a capacitive touch panel, comprising: a first transparent substrate, wherein a plurality of first sensing electrode serials are disposed in a first direction on a surface of the first transparent substrate, the first sensing electrode serials are formed by cascading a plurality of first sensing electrodes, a first hollow region is formed between two adjacent first sensing electrodes, and a first compensating electrode is formed in the first hollow region on the surface of the first transparent substrate; a second transparent substrate, wherein a plurality of second sensing electrode serials are disposed in a second direction on a surface of the second transparent substrate, the second sensing electrode serials are formed by cascading a plurality of second sensing electrodes, a second hollow region is formed between two adjacent second sensing electrodes, the second direction is perpendicular to the first direction, and a partition region is arranged between the first sensing electrodes and the second sensing electrodes adjacent thereto; and an isolation layer, disposed between the first transparent substrate and the second transparent substrate, configured to attach the first transparent substrate to the second transparent substrate, and configured to separate the first sensing electrodes from the second sensing electrodes.

In one exemplary embodiment, the disclosure is directed to a capacitive touch panel, comprising: a first transparent substrate, wherein a plurality of first sensing electrode serials are disposed in a first direction on a surface of the first transparent substrate, the first sensing electrode serials are formed by cascading a plurality of first sensing electrodes, and a first hollow region is formed between two adjacent first sensing electrodes; a second transparent substrate, wherein a plurality of second sensing electrode serials are disposed in a second direction on a surface of the second transparent substrate, the second sensing electrode serials are formed by cascading a plurality of second sensing electrodes, a second hollow region is formed between two adjacent second sensing electrodes, a second compensating electrode is formed in the second hollow region on the surface of the second transparent substrate, the second direction is perpendicular to the first direction, and a partition region is arranged between the first sensing electrodes and the second sensing electrodes adjacent thereto; and an isolation layer, disposed between the first transparent substrate and the second transparent substrate, configured to attach the first transparent substrate to the second transparent substrate, and configured to separate the first sensing electrodes from the second sensing electrodes.

BRIEF DESCRIPTION OF DRAWINGS

The invention can be more fully understood by reading the subsequent detailed description and examples with references made to the accompanying drawings, wherein:

FIG. 10B is a diagram for illustrating an enlarged view of a portion of FIG. 10;

FIG. 12B is a diagram for illustrating an enlarged view of a portion of FIG. 12;

DETAILED DESCRIPTION OF THE INVENTION

Figure 1:
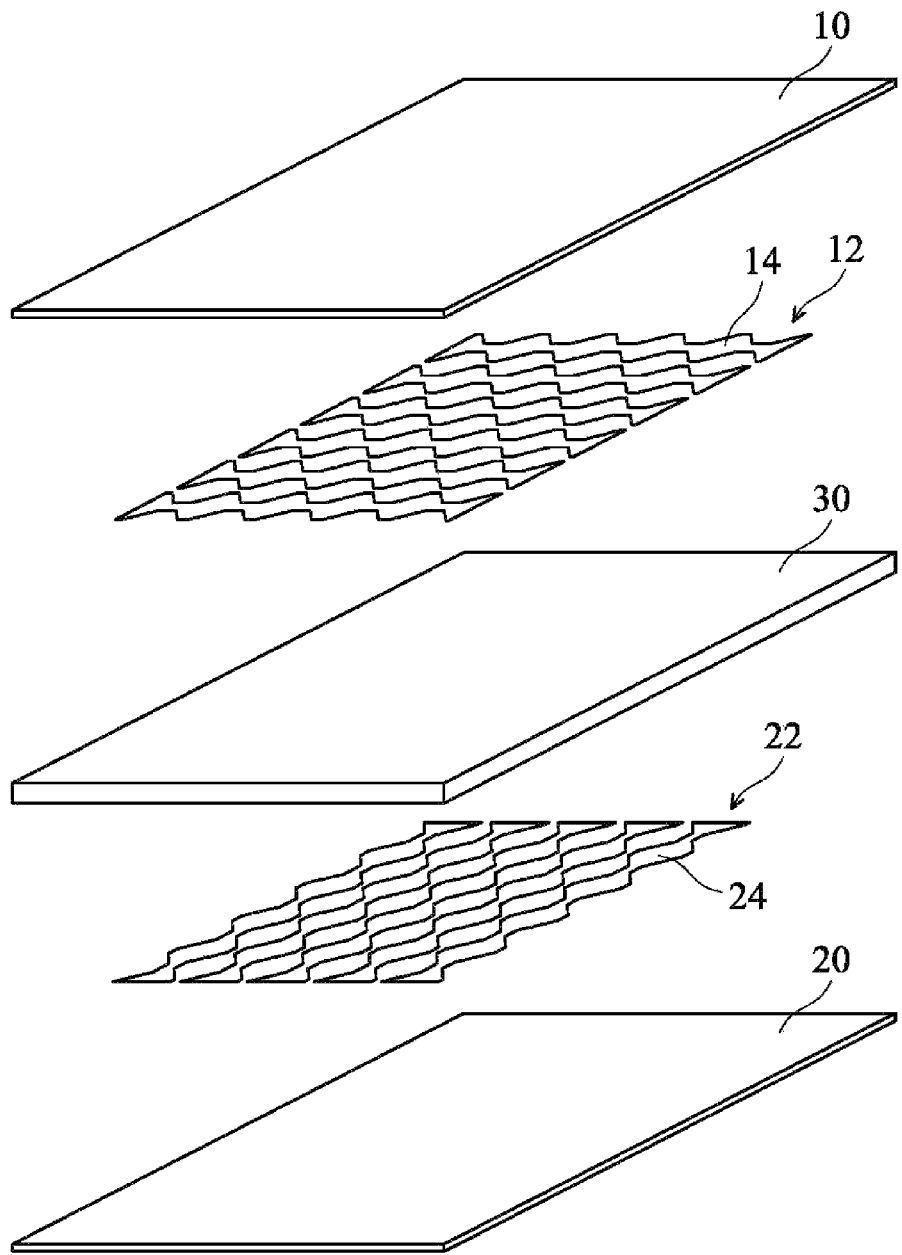
FIG. 1 is a diagram for illustrating an exploded view of a capacitive touch panel in prior art.
Figure 2:
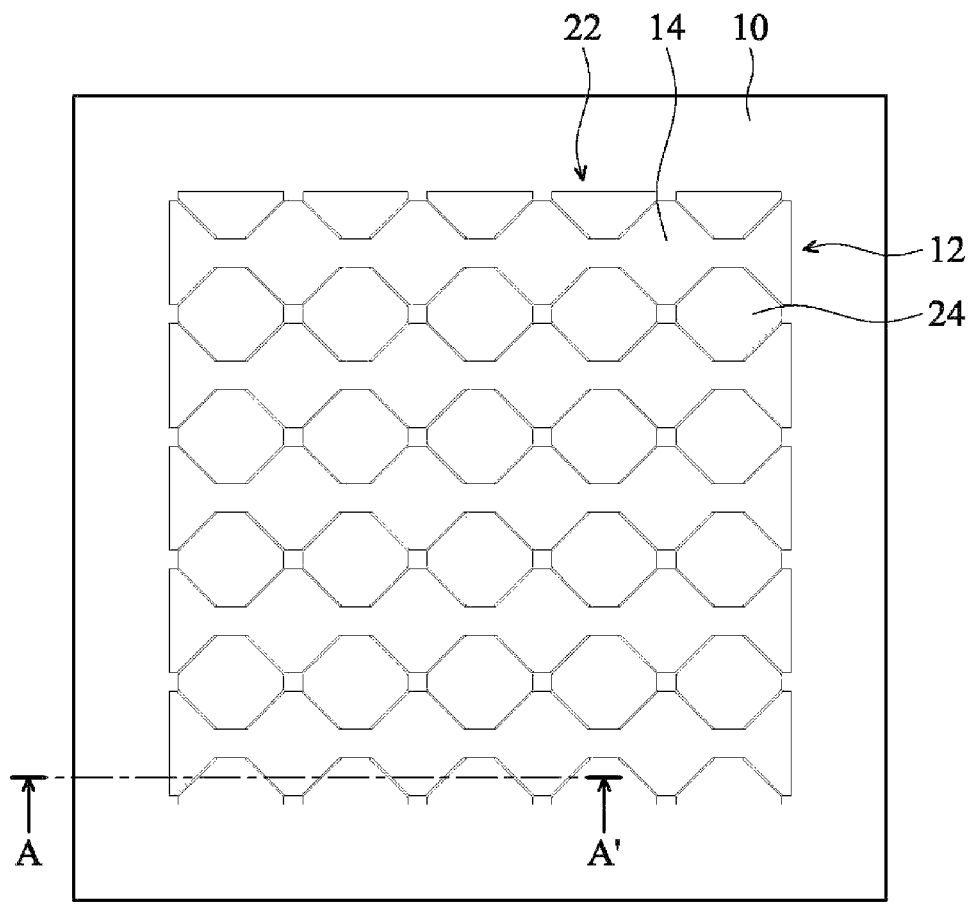
FIG. 2 is a diagram for illustrating a front view of a capacitive touch panel in prior art.
Figure 2A:
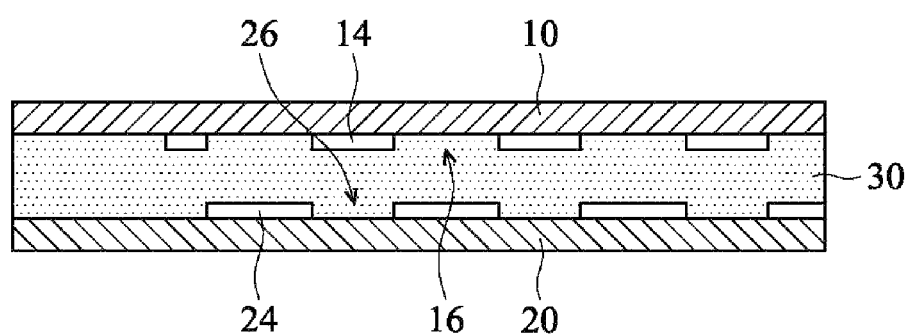
FIG. 2A is a diagram for illustrating a sectional view of a capacitive touch panel along the line AA' of FIG. 2.
Figure 3:
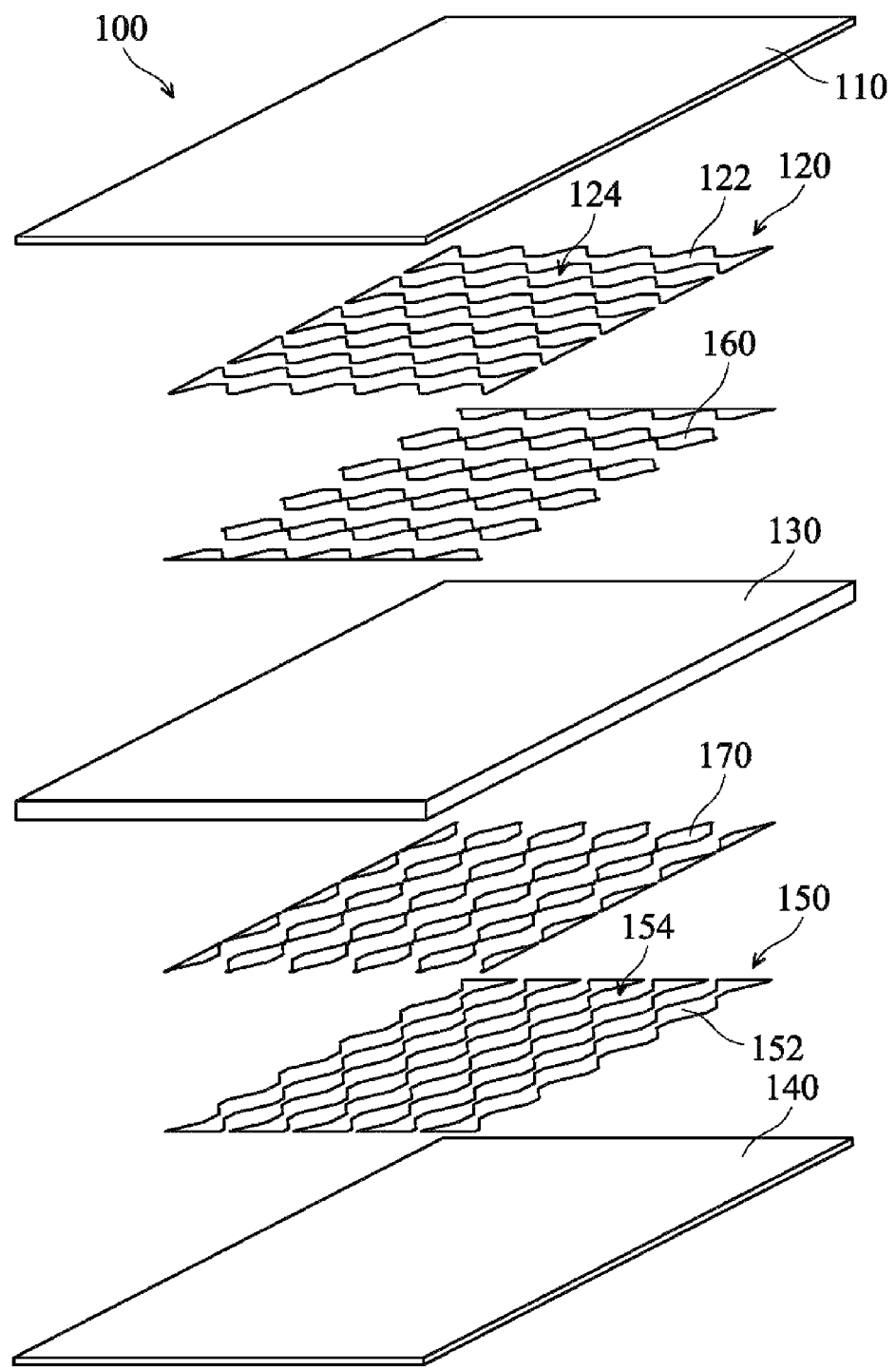
FIG. 3 is a diagram for illustrating an exploded view of a capacitive touch panel according to a first embodiment of the invention.
Figure 4:
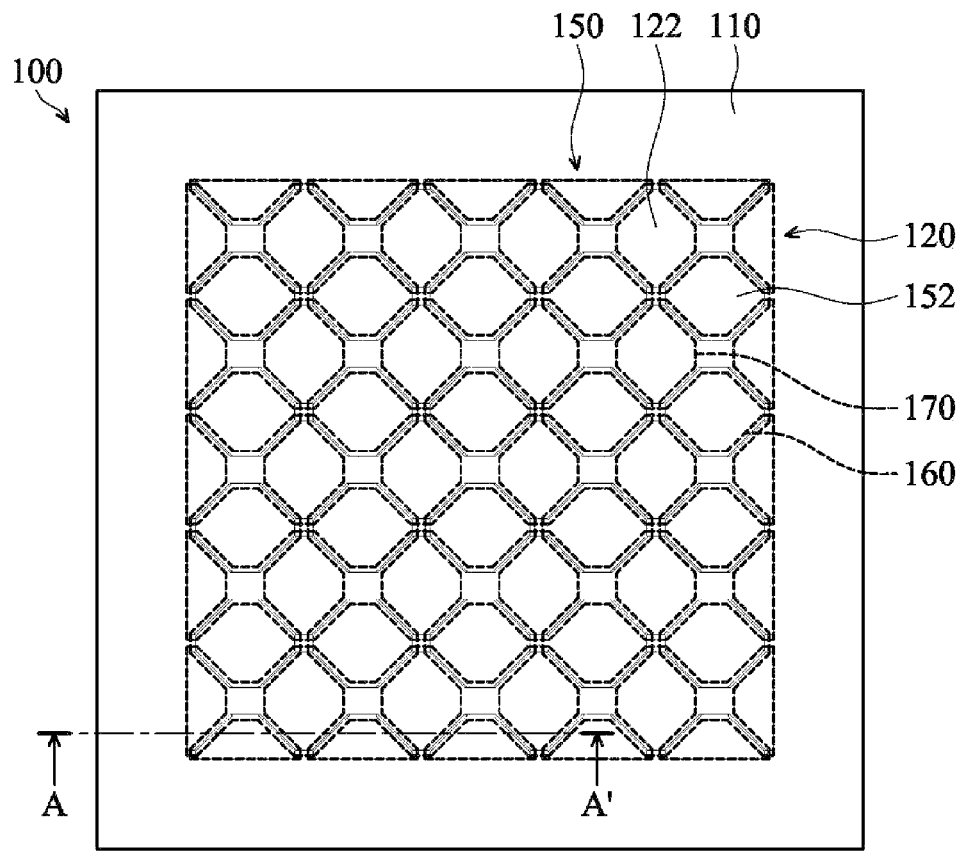
FIG. 4 is a diagram for illustrating a front view of a capacitive touch panel according to a first embodiment of the invention.

FIG. 3 is a diagram for illustrating an exploded view of a capacitive touch panel 100 according to a first embodiment of the invention. FIG. 4 is a diagram for illustrating a front view of the capacitive touch panel 100 according to the first embodiment of the invention. As shown in FIG. 3 and FIG. 4, in the first embodiment, the capacitive touch panel 100 includes a first transparent panel 110, first sensing electrode serials 120, an isolation layer 130, a second transparent panel 140, and second sensing electrode serials 150. The first sensing electrode serials 120 are disposed in a first direction on the bottom surface of the first transparent substrate 110. Each first sensing electrode serial 120 is formed by cascading first sensing electrodes 122, each of which substantially has a diamond shape. The first sensing electrode serials 120 are made of transparent conductive materials, such as ITO (Indium Tin Oxide), AZO (Aluminum-doped Zinc Oxide), IZO (Indium Zinc Oxide), nanosilver films, CNT (Carbon Nanotube), or graphene films. The first sensing electrode serials 120 are formed on the surface of the first transparent substrate 110 through etching, printing, or sputtering processes. Each first hollow region 124 is formed between two adjacent first sensing electrodes 122.

In the first embodiment relative to the capacitive touch panel 100, the second sensing electrode serials 150 are disposed in a second direction on the top surface of the second transparent substrate 140. Each second sensing electrode serial 150 is formed by cascading second sensing electrodes 152, each of which substantially has a diamond shape. The second sensing electrode serials 150 are made of transparent conductive materials, such as ITO (Indium Tin Oxide), AZO (Aluminum-doped Zinc Oxide), IZO (Indium Zinc Oxide), nanosilver films, CNT (Carbon Nanotube), or graphene films. The second sensing electrode serials 150 are formed on the surface of the second transparent substrate 140 through etching, printing, or sputtering processes. Each second hollow region 154 is formed between two adjacent second sensing electrodes 152. The second direction is perpendicular to the aforementioned first direction.

Figure 4A:
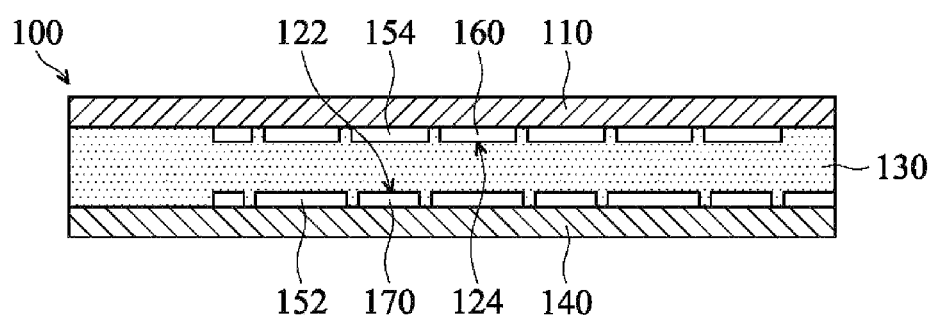
FIG. 4A is a diagram for illustrating a sectional view of a capacitive touch panel along the line AA' of FIG. 4.

FIG. 4A is a diagram for illustrating a sectional view of the capacitive touch panel 100 along the line AA' according to the first embodiment of the invention. To improve the optical performance of the capacitive touch panel 100, and to prevent the first and second sensing electrode serials 120 and 150 from emerging on the surface of the capacitive touch panel 100, each first compensating electrode 160 is formed in a respective first hollow region 124 on the surface of the first transparent substrate 110, and each second compensating electrode 170 is formed in a respective second hollow region 154 on the surface of the second transparent substrate 150. The first and second compensating electrodes 160 and 170 are made of transparent conductive materials, such as ITO (Indium Tin Oxide), AZO (Aluminum-doped Zinc Oxide), IZO (Indium Zinc Oxide), nanosilver films, CNT (Carbon Nanotube), or graphene films. Preferably, the first and second compensating electrodes 160 and 170 may be made of the same transparent conductive materials as those of the corresponding first and second sensing electrodes 122 and 152. When the first and second sensing electrode serials 120 and 150 are formed on the first and second transparent substrates 110 and 140 through a manufacturing process, the invented first and second compensating electrodes 160 and 170 may be also produced and disposed thereon through the same manufacturing process, and therefore the aforementioned process is simplified. Each appropriate gap is formed between a respective first compensating electrode 160 and a respective first sensing electrode 122, and/or formed between a respective second compensating electrode 170 and a respective second sensing electrode 152. These gaps are arranged to isolate the first and second compensating electrodes 160 and 170 from the first and second sensing electrodes 122 and 152. The isolation layer 130 is disposed between the first and second transparent substrates 110 and 140. The isolation layer 130 is configured to attach the first transparent substrate 110 to the second transparent substrate 140, and configured to separate the first sensing electrodes 122 from the second sensing electrodes 152. From the front view of the capacitive touch panel 100, each partition region 180 having an appropriate size is arranged between a respective first sensing electrode 122 and a respective second sensing electrode 152 adjacent thereto. The isolation layer 130 is made of OCA (Optically Clear Adhesive) or LOCA (Liquid Optically Clear Adhesive).

Figure 4B:
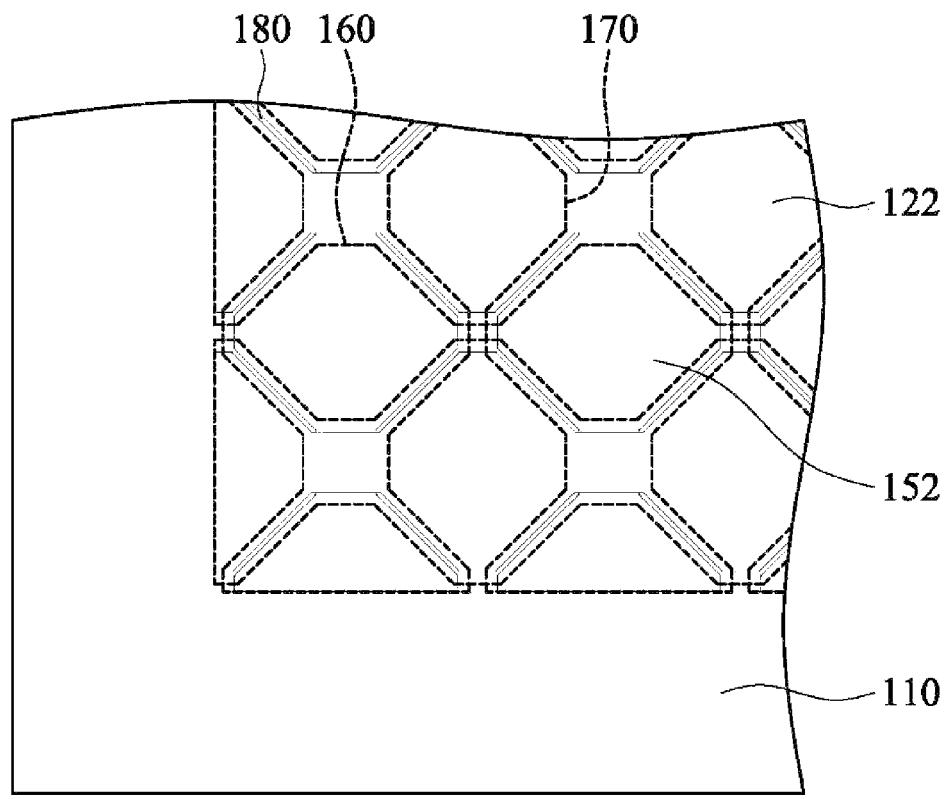
FIG. 4B is a diagram for illustrating an enlarged view of a portion of FIG. 4.

FIG. 4B is a diagram for illustrating an enlarged view of a portion of FIG. 4 according to the first embodiment of the invention. In the first embodiment of the invention, the areas of the first and second compensating electrodes 160 and 170 are smaller than those of the corresponding second and first sensing electrodes 152 and 122, respectively. When light passes through different interfaces (e.g., the first transparent panel 110, the first sensing electrodes 122, the isolation layer 130, the second sensing electrodes 152, and the second transparent panel 140) of the capacitive touch panel 100, the light is reflected and refracted in different ways because these interfaces have non-uniform refraction indexes. The invention proposes the first and second compensating electrodes 160 and 170 to compensate and reduce the effect of the different interface refraction indexes on the passing light. As a result, the brightness on the surface of the capacitive touch panel 100 may not be non-uniform, and the patterns of the first and second sensing electrodes 122 and 152 may not tend to emerge on the surface of the capacitive touch panel 100 when the light passes through different materials and is reflected and refracted by them. The aforementioned first and second transparent substrates 110 and 140 are made of transparent materials, such as glass, PMMA (Polymethyl Methacrylate, Acrylic), PVC (Polyvinyl Chloride), PP (Polypropylene), PET (Polyethylene Terephthalate), PI (Polyimide), PC (Polycarbonate), COP/COC (Cyclic Olefin Polymer), Arton (Cyclic Polyolefins), ABS (Acrylonitrile Butadiene Styrene), PE (Polyethylene), PMMA/PC composite boards, or PMMA/PC/PMMA composite boards.

Figure 5:
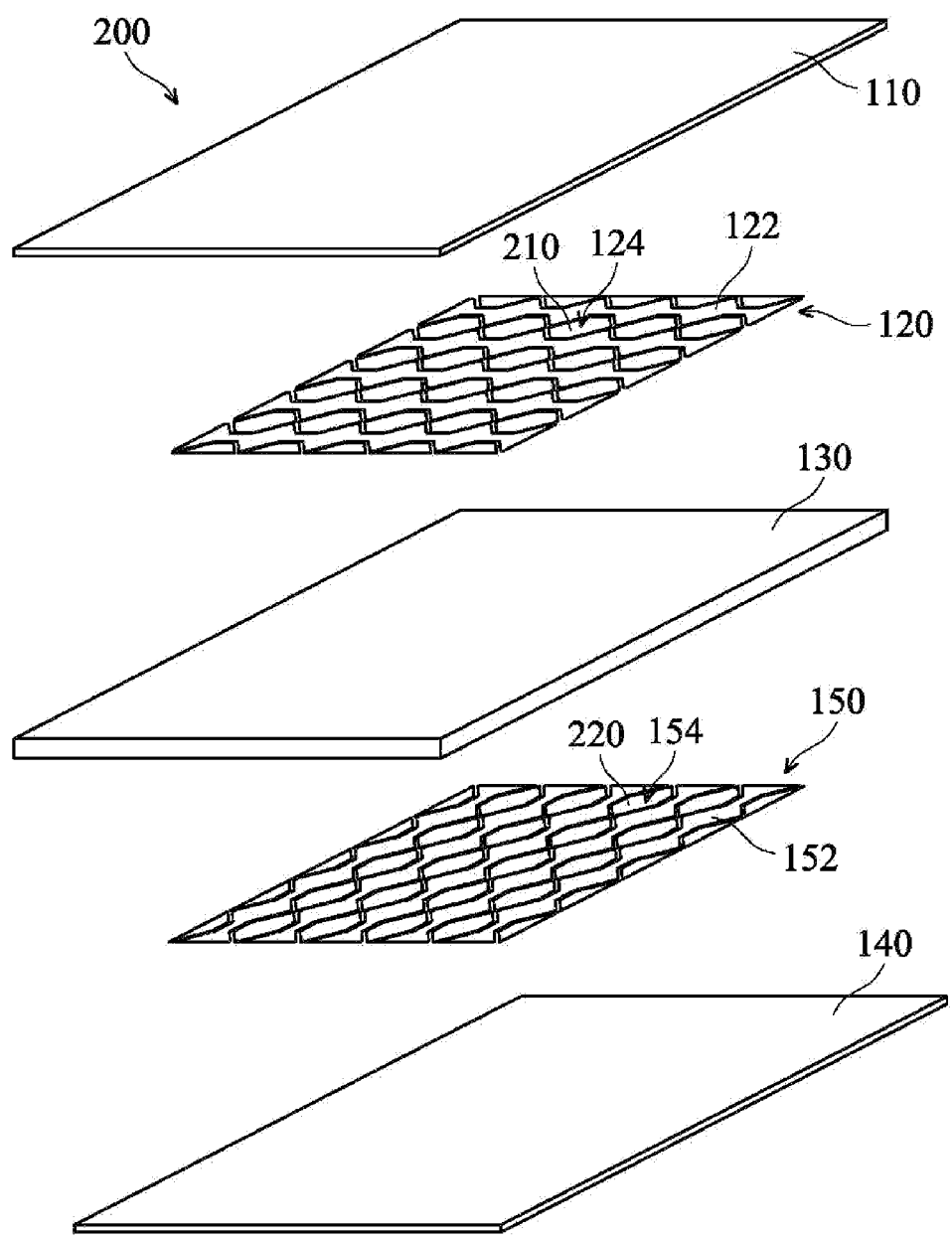
FIG. 5 is a diagram for illustrating an exploded view of a capacitive touch panel according to a second embodiment of the invention.
Figure 6:
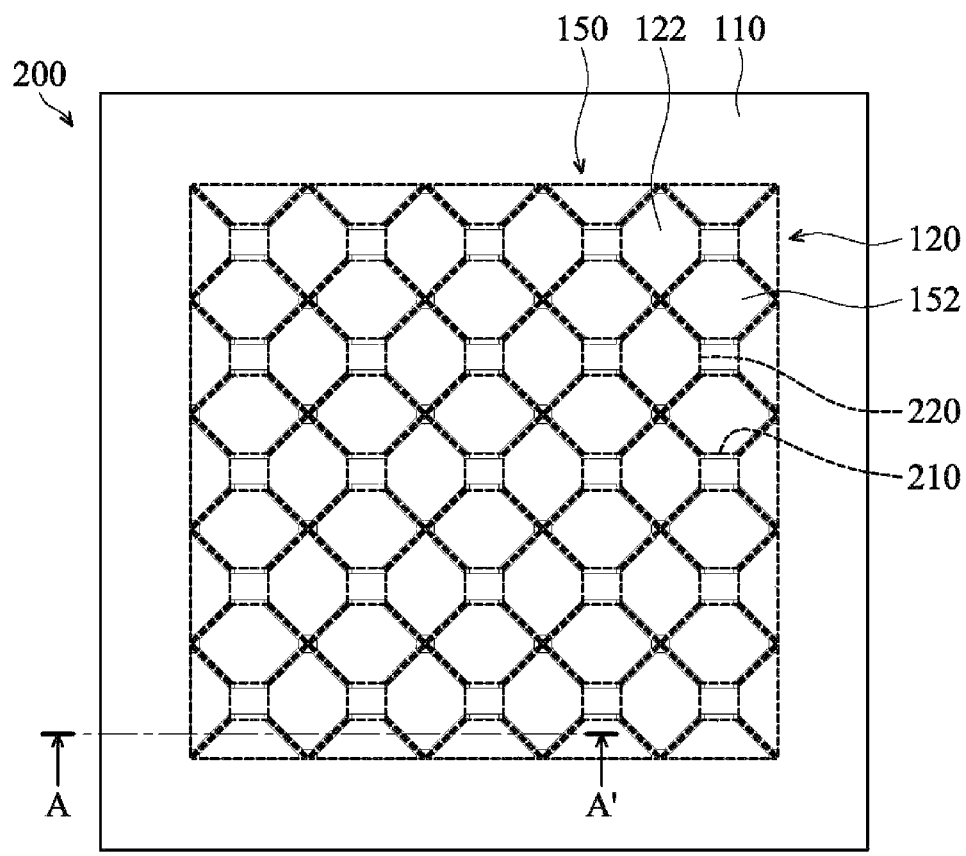
FIG. 6 is a diagram for illustrating a front view of a capacitive touch panel according to a second embodiment of the invention.
Figure 6A:
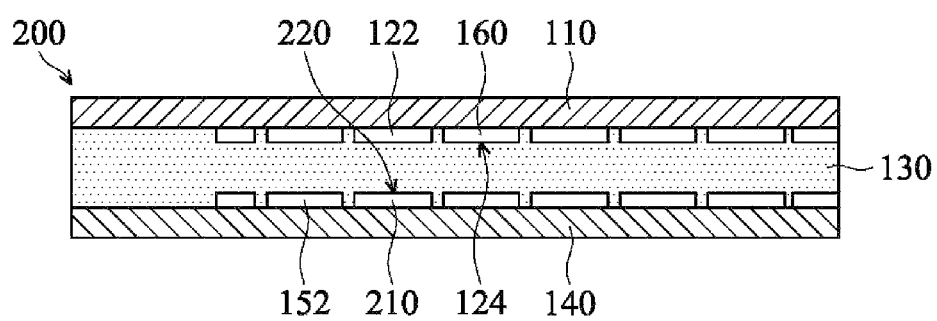
FIG. 6A is a diagram for illustrating a sectional view of a capacitive touch panel along the line AA' of FIG. 6.
Figure 6B:
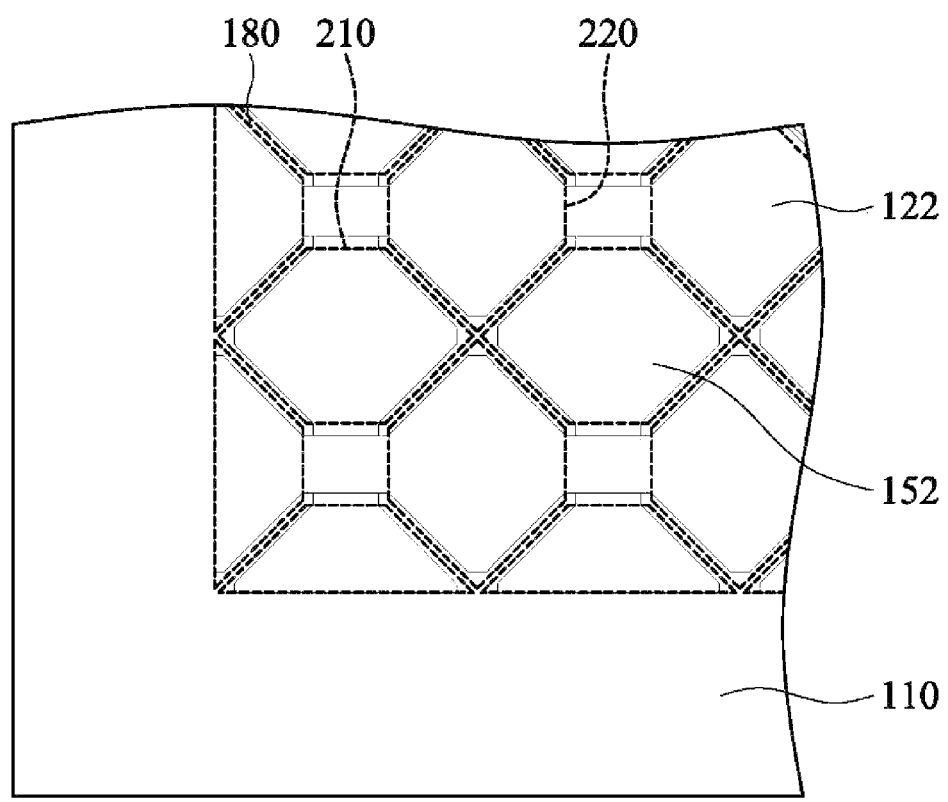
FIG. 6B is a diagram for illustrating an enlarged view of a portion of FIG. 6.

FIG. 5 is a diagram for illustrating an exploded view of a capacitive touch panel 200 according to a second embodiment of the invention. FIG. 6 is a diagram for illustrating a front view of the capacitive touch panel 200 according to the second embodiment of the invention. As shown in FIG. 5 and FIG. 6, in the second embodiment, the capacitive touch panel 200 also includes a first transparent panel 110, first sensing electrode serials 120, an isolation layer 130, a second transparent panel 140, and second sensing electrode serials 150. The main structure is substantially the same as that of the first embodiment. Please further refer to FIG. 6A and FIG. 6B. Each first hollow region 124 is formed between two adjacent first sensing electrodes 122, and each second hollow region 154 is formed between two adjacent second sensing electrodes 152. Each third compensating electrode 210 is formed in a respective first hollow region 124 on the surface of the first transparent substrate 110, and each fourth compensating electrode 220 is formed in a respective second hollow region 154 on the surface of the second transparent substrate 140. The difference between the first and second embodiments is that the areas of the third and fourth compensating electrodes 210 and 220 in the second embodiment are larger than those of the corresponding second and first sensing electrodes 152 and 122, respectively. By changing the areas of the third and fourth compensating electrodes 210 and 220 in the second embodiment, when the refraction indexes of the interfaces are changed due to adjustment of the interface materials (e.g., a change in the materials or thicknesses of the first and second transparent substrate 110 and 140, and a change in the composite or thickness of the isolation layer 130), the areas of the third and fourth compensating electrodes 210 and 220 are adjusted correspondingly, and the optical performance of the capacitive touch panel 100 is therefore compensated and optimized.

Figure 7:
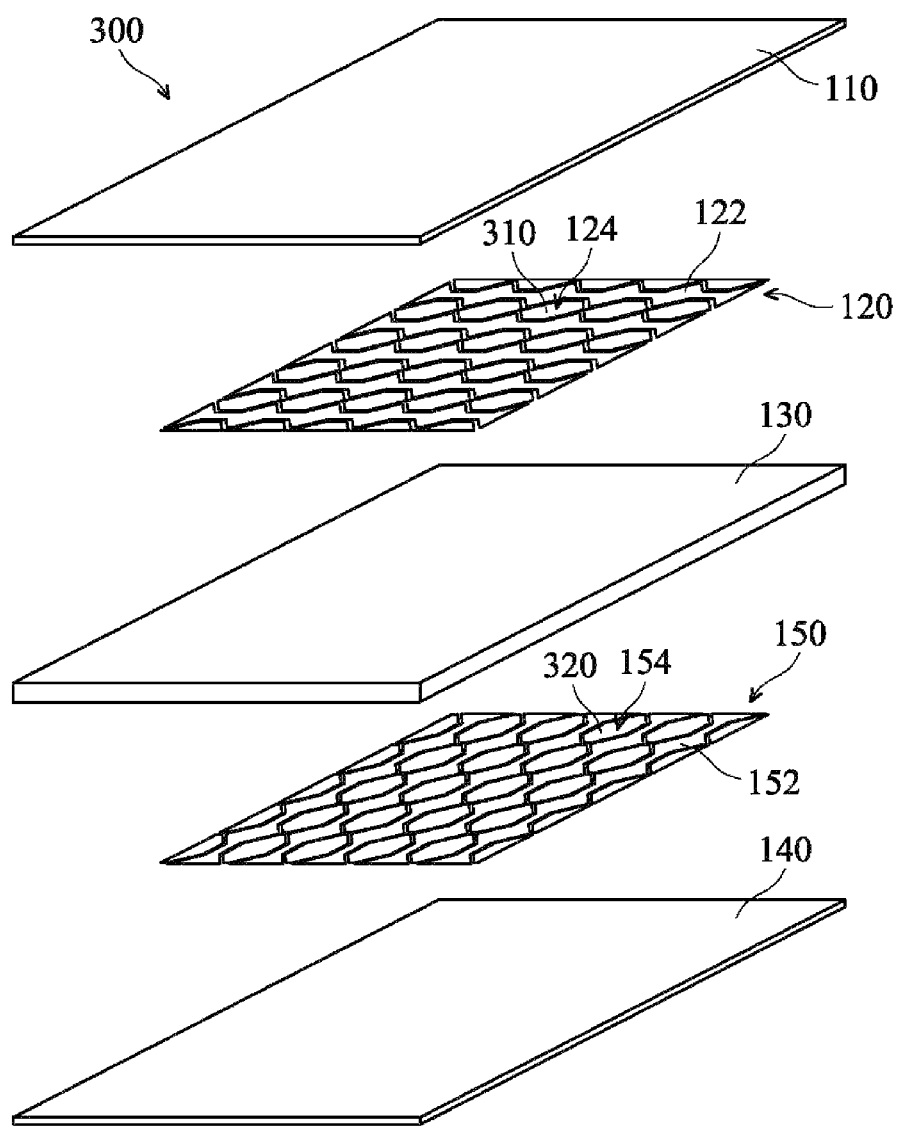
FIG. 7 is a diagram for illustrating an exploded view of a capacitive touch panel according to a third embodiment of the invention.
Figure 8:
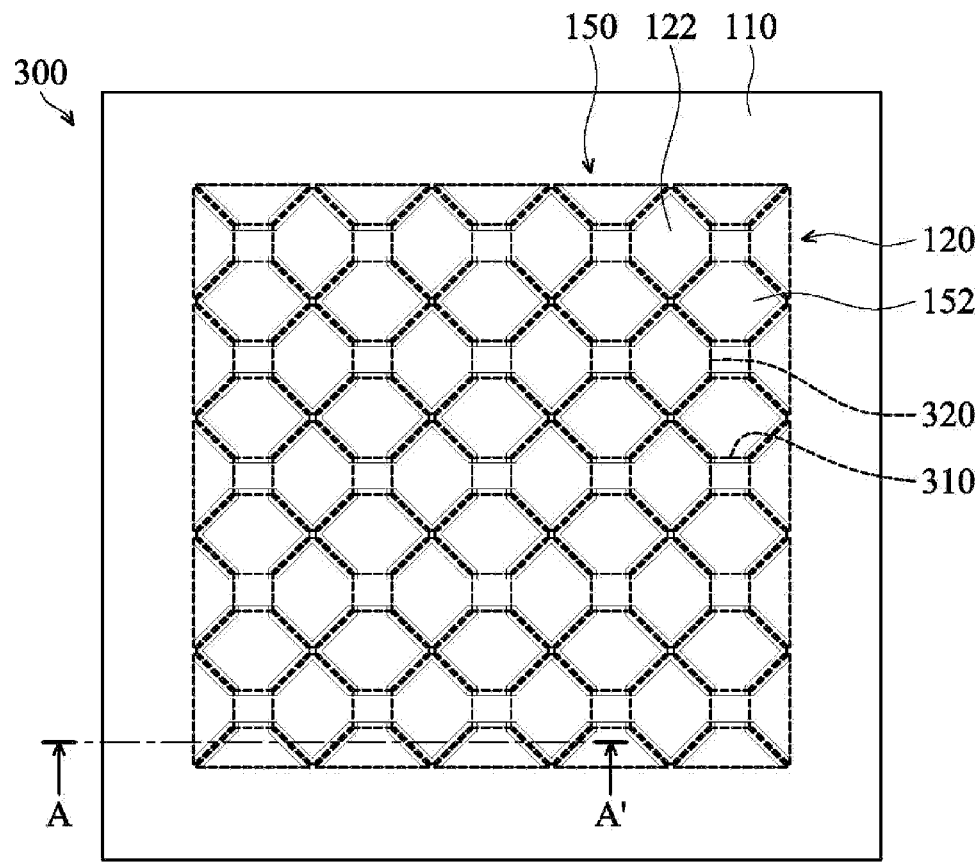
FIG. 8 is a diagram for illustrating a front view of a capacitive touch panel according to a third embodiment of the invention.
Figure 8A:
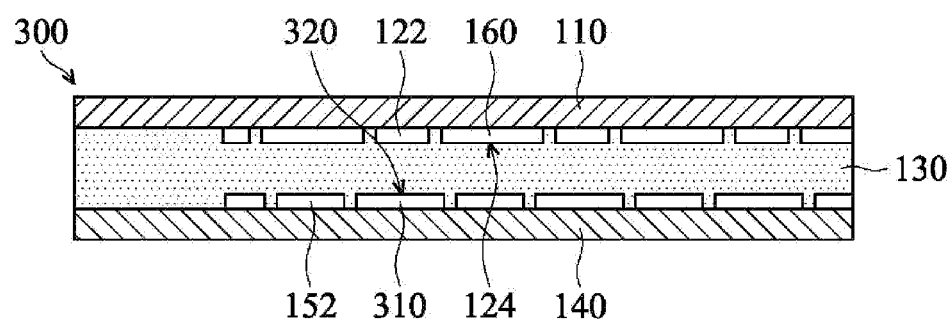
FIG. 8A is a diagram for illustrating a sectional view of a capacitive touch panel along the line AA' of FIG. 8.
Figure 8B:
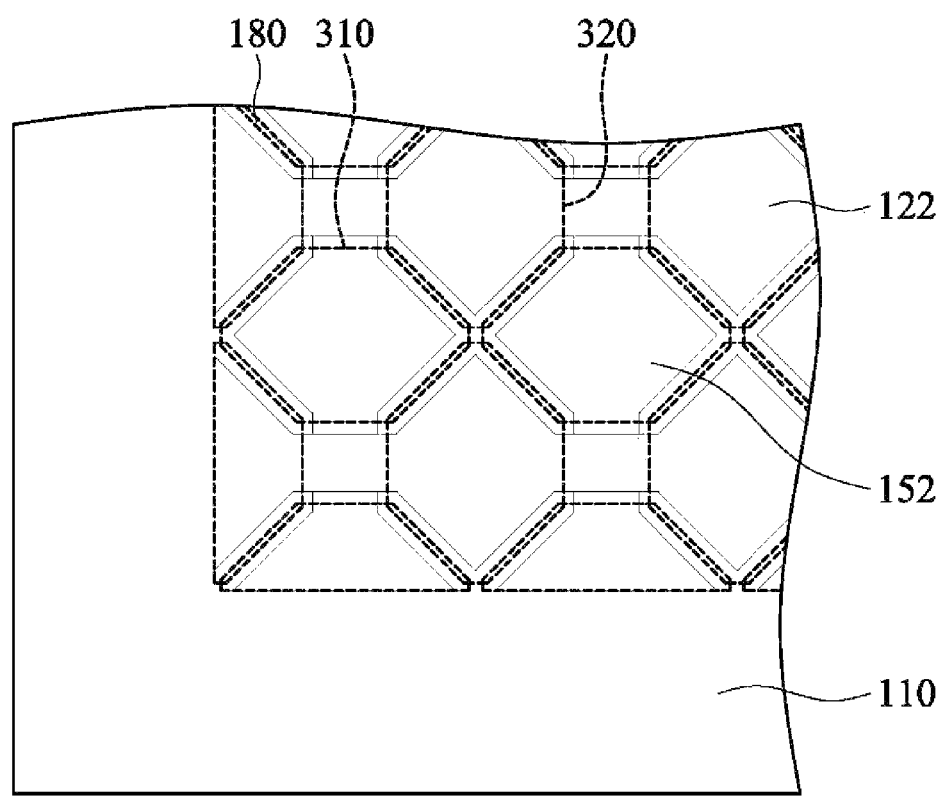
FIG. 8B is a diagram for illustrating an enlarged view of a portion of FIG. 8.

FIG. 7 is a diagram for illustrating an exploded view of a capacitive touch panel 300 according to a third embodiment of the invention. FIG. 8 is a diagram for illustrating a front view of the capacitive touch panel 300 according to the third embodiment of the invention. As shown in FIG. 7 and FIG. 8, in the third embodiment, the capacitive touch panel 300 also includes a first transparent panel 110, first sensing electrode serials 120, an isolation layer 130, a second transparent panel 140, and second sensing electrode serials 150. The main structure is substantially the same as that of the second embodiment. Please further refer to FIG. 8A and FIG. 8B. In the third embodiment, each first hollow region 124 is formed between two adjacent first sensing electrodes 122, and each second hollow region 154 is formed between two adjacent second sensing electrodes 152. Each fifth compensating electrode 310 is formed in a respective first hollow region 124 on the surface of the first transparent substrate 110, and each sixth compensating electrode 320 is formed in a respective second hollow region 154 on the surface of the second transparent substrate 140. The areas of the fifth and sixth compensating electrodes 310 and 320 are larger than those of the corresponding second and first sensing electrodes 152 and 122, respectively. The difference between the third and second embodiments is that each fifth compensating electrode 310 partially overlaps with a respective sixth compensating electrode 320 adjacent thereto in the partition region 180 so as to form a partial overlapping region 330.

Figure 9:
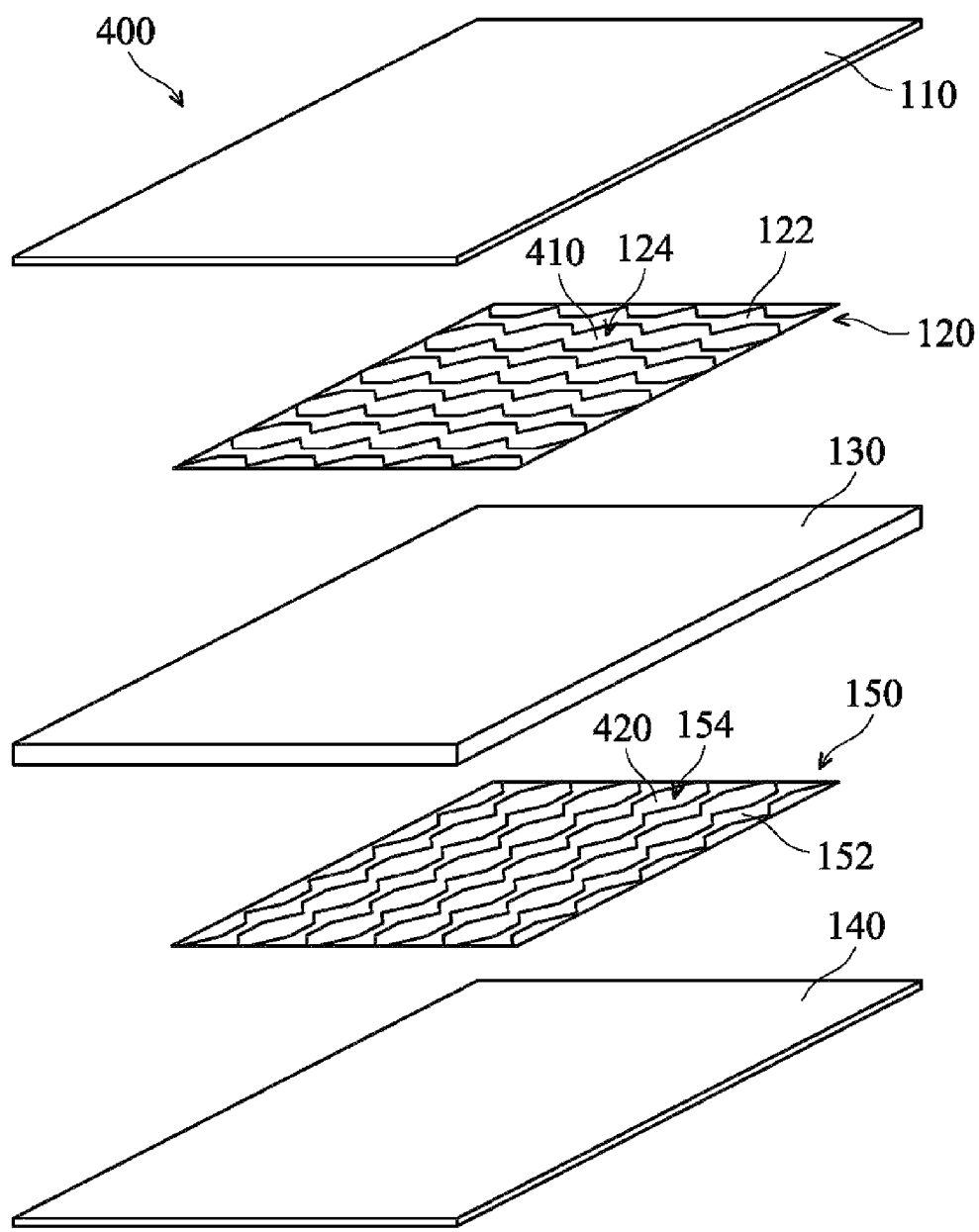
FIG. 9 is a diagram for illustrating an exploded view of a capacitive touch panel according to a fourth embodiment of the invention.
Figure 10:
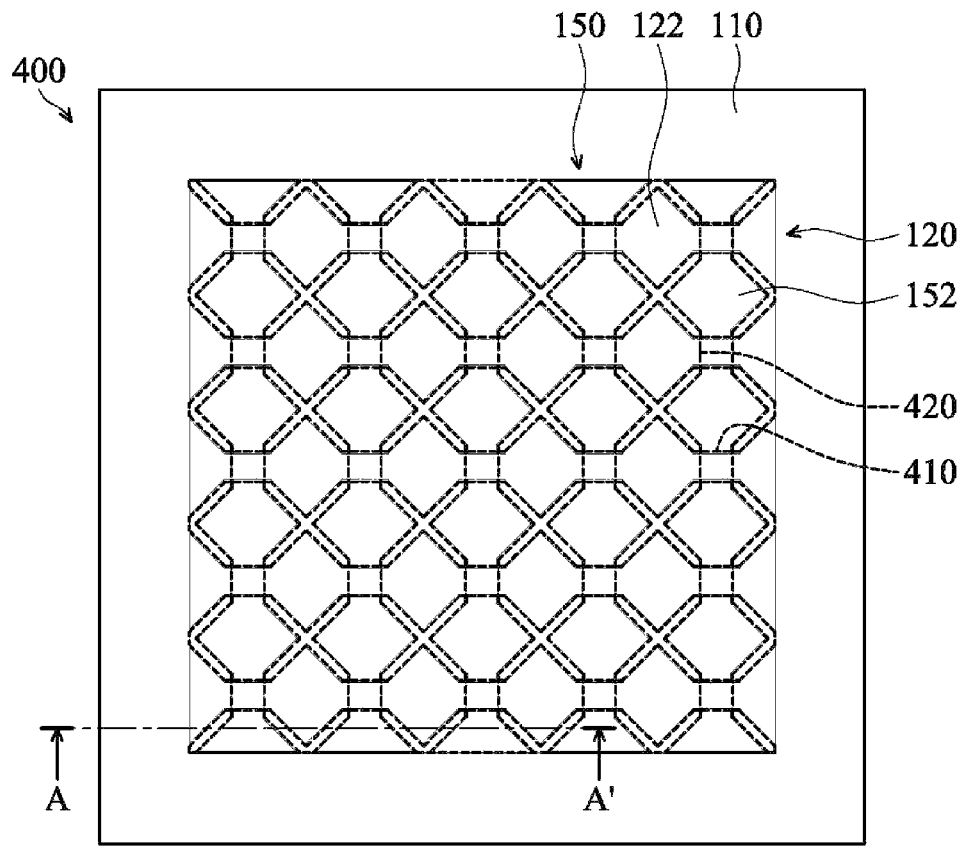
FIG. 10 is a diagram for illustrating a front view of a capacitive touch panel according to a fourth embodiment of the invention.
Figure 10A:
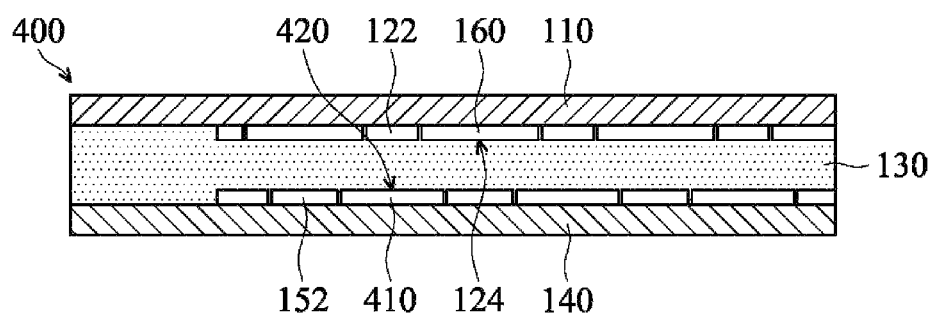
FIG. 10A is a diagram for illustrating a sectional view of a capacitive touch panel along the line AA' of FIG. 10.
Figure 10:
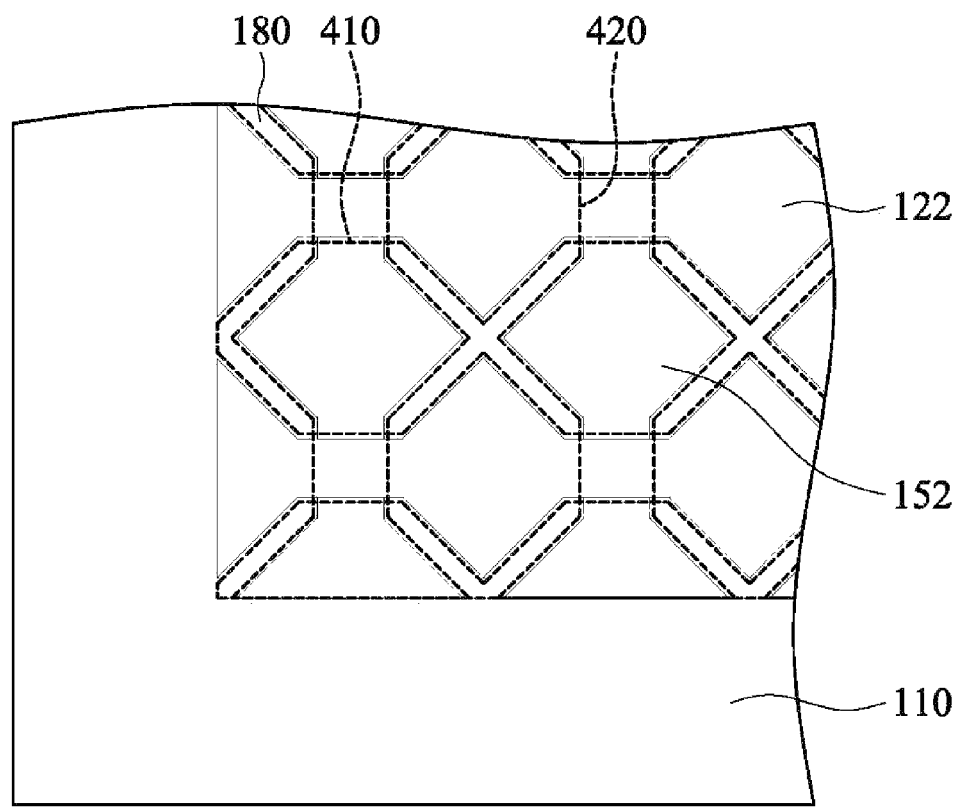

FIG. 9 is a diagram for illustrating an exploded view of a capacitive touch panel 400 according to a fourth embodiment of the invention. FIG. 10 is a diagram for illustrating a front view of the capacitive touch panel 400 according to the fourth embodiment of the invention. As shown in FIG. 9 and FIG. 10, in the fourth embodiment, the capacitive touch panel 400 also includes a first transparent panel 110, first sensing electrode serials 120, an isolation layer 130, a second transparent panel 140, and second sensing electrode serials 150. The main structure is substantially the same as that of the third embodiment. Please further refer to FIG. 10A and FIG. 10B. In the fourth embodiment, each first hollow region 124 is formed between two adjacent first sensing electrodes 122, and each second hollow region 154 is formed between two adjacent second sensing electrodes 152. Each seventh compensating electrode 410 is formed in a respective first hollow region 124 on the surface of the first transparent substrate 110, and each eighth compensating electrode 420 is formed in a respective second hollow region 154 on the surface of the second transparent substrate 140. The areas of the seventh and eighth compensating electrodes 410 and 420 are larger than those of the corresponding second and first sensing electrodes 152 and 122, respectively. The difference between the fourth and third embodiments is that each seventh compensating electrode 410 completely overlaps with a respective eighth compensating electrode 420 adjacent thereto in the partition region 180 so as to form a whole overlapping region 430.

Figure 11:
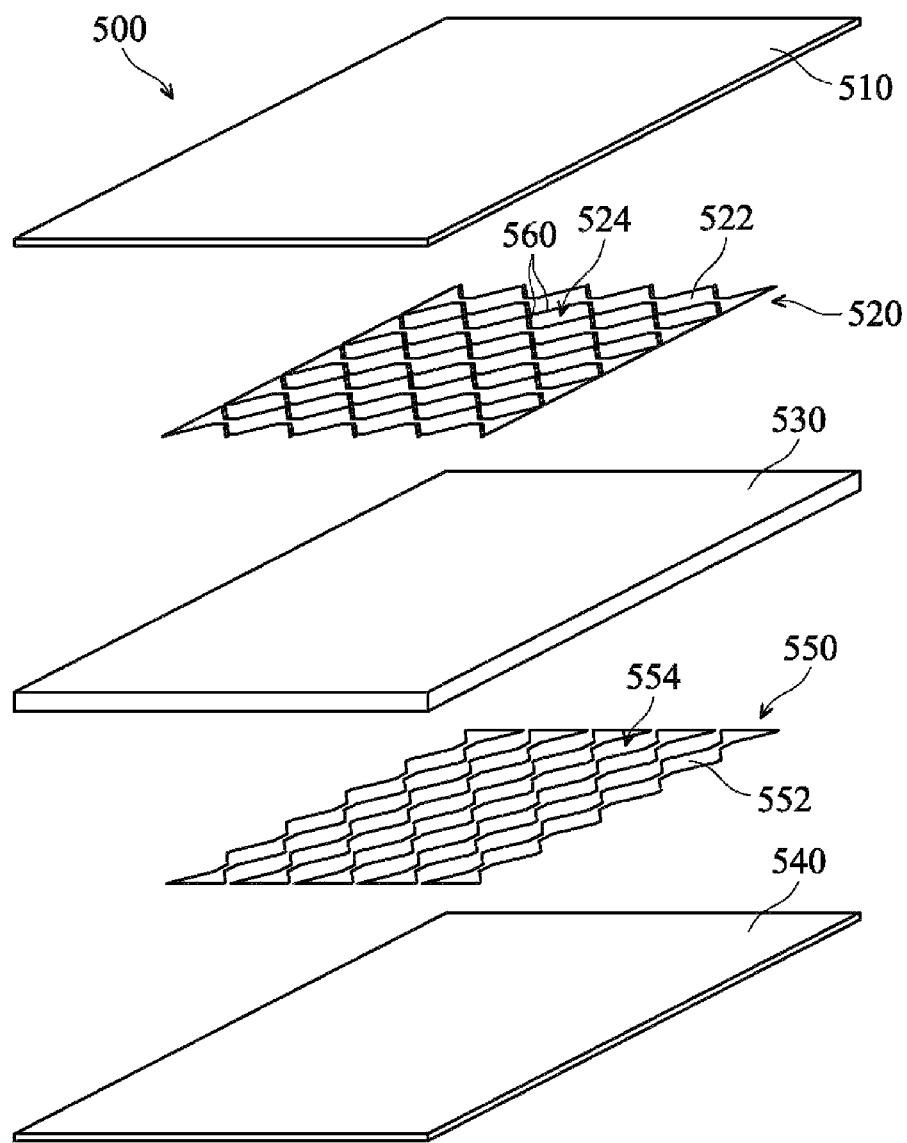
FIG. 11 is a diagram for illustrating an exploded view of a capacitive touch panel according to a fifth embodiment of the invention.
Figure 12:
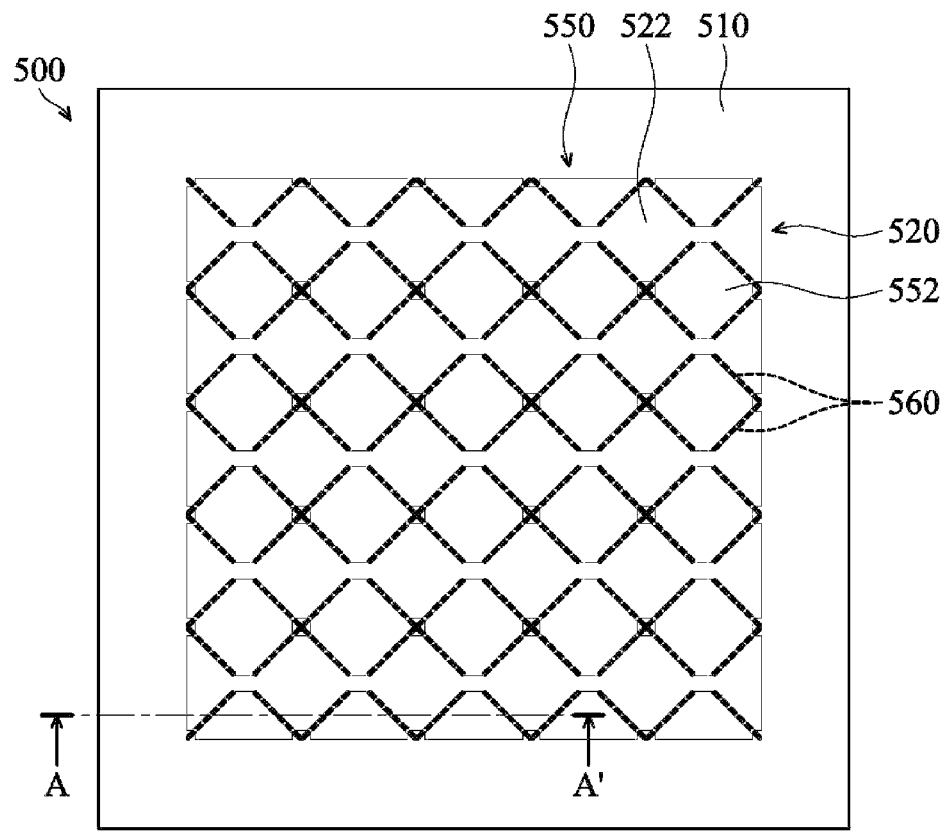
FIG. 12 is a diagram for illustrating a front view of a capacitive touch panel according to a fifth embodiment of the invention.

FIG. 11 is a diagram for illustrating an exploded view of a capacitive touch panel 500 according to a fifth embodiment of the invention. FIG. 12 is a diagram for illustrating a front view of the capacitive touch panel 500 according to the fifth embodiment of the invention. As shown in FIG. 11 and FIG. 12, in the fifth embodiment, the capacitive touch panel 500 includes a first transparent panel 510, first sensing electrode serials 520, an isolation layer 530, a second transparent panel 540, and second sensing electrode serials 550. The first sensing electrode serials 520 are disposed in a first direction on the bottom surface of the first transparent substrate 510. Each first sensing electrode serial 520 is formed by cascading first sensing electrodes 522, each of which substantially has a diamond shape. The first sensing electrode serials 520 are made of transparent conductive materials, such as ITO (Indium Tin Oxide), AZO (Aluminum-doped Zinc Oxide), IZO (Indium Zinc Oxide), nanosilver films, CNT (Carbon Nanotube), or graphene films. The first sensing electrode serials 520 are formed on the surface of the first transparent substrate 510 through etching, printing, or sputtering processes. Each first hollow region 524 is formed between two adjacent first sensing electrodes 522.

In the fifth embodiment relative to the capacitive touch panel 500, the second sensing electrode serials 550 are disposed in a second direction on the top surface of the second transparent substrate 540. Each second sensing electrode serial 550 is formed by cascading second sensing electrodes 552, each of which substantially has a diamond shape. The second sensing electrode serials 550 are made of transparent conductive materials, such as ITO (Indium Tin Oxide), AZO (Aluminum-doped Zinc Oxide), IZO (Indium Zinc Oxide), nanosilver films, CNT (Carbon Nanotube), or graphene films. The second sensing electrode serials 550 are formed on the surface of the second transparent substrate 540 through etching, printing, or sputtering processes. Each second hollow region 554 is formed between two adjacent second sensing electrodes 552. The second direction is perpendicular to the aforementioned first direction.

Figure 12A:
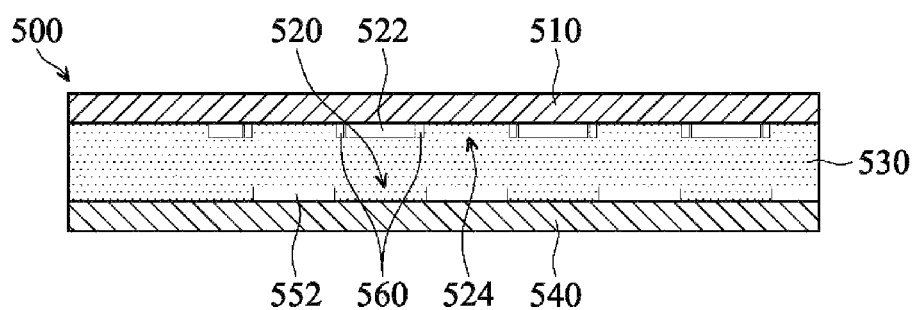
FIG. 12A is a diagram for illustrating a sectional view of a capacitive touch panel along the line AA' of FIG. 12.
Figure 12:
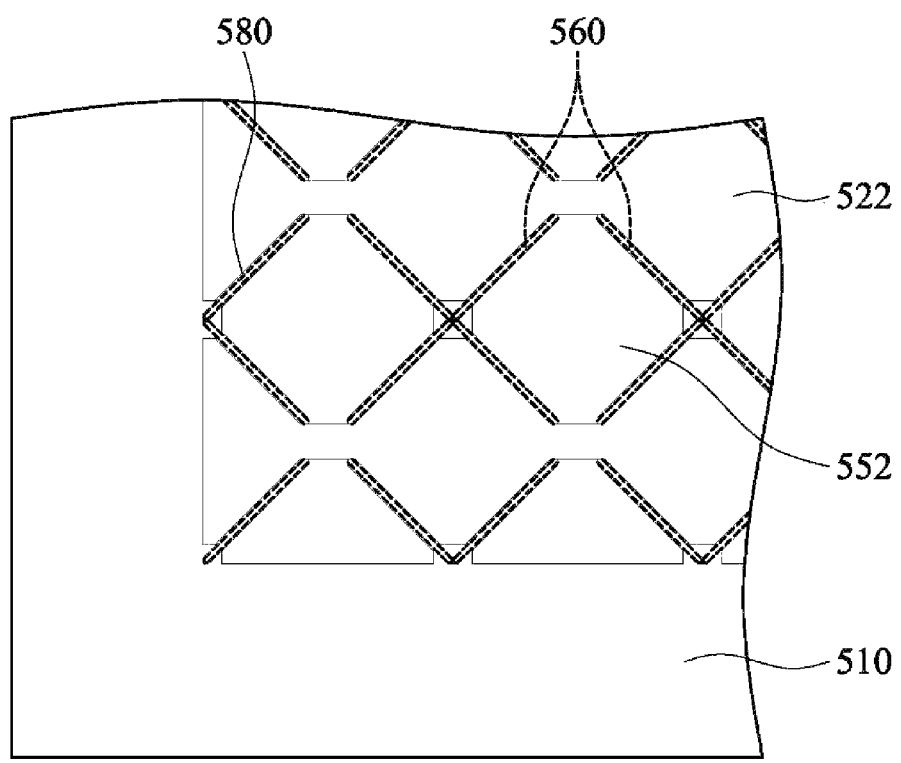

Please further refer to FIG. 12A. FIG. 12A is a diagram for illustrating a sectional view of the capacitive touch panel 500 along the line AA' according to the fifth embodiment of the invention (FIG. 12). In the fifth embodiment of the invention, adjustments are made such that just each ninth compensating electrode 560 is formed in a respective first hollow region 524 on the surface of the first transparent substrate 510. The ninth compensating electrodes 560 are made of transparent conductive materials, such as ITO (Indium Tin Oxide), AZO (Aluminum-doped Zinc Oxide), IZO (Indium Zinc Oxide), nanosilver films, CNT (Carbon Nanotube), or graphene films. Preferably, the ninth compensating electrodes 560 may be made of the same transparent conductive materials as those of the corresponding first sensing electrodes 522. In this embodiment, when the first sensing electrode serials 520 are formed on the first transparent substrates 510 through a manufacturing process, the invented ninth compensating electrodes 560 may be also produced and disposed thereon through the same manufacturing process, and therefore the aforementioned process is simplified. Each appropriate gap is formed between a respective ninth compensating electrode 560 and a respective first sensing electrode 522. These gaps are arranged to isolate the ninth compensating electrodes 560 from the first sensing electrodes 522. Similarly, the isolation layer 530 is disposed between the first and second transparent substrates 510 and 540. The isolation layer 530 is configured to attach the first transparent substrate 510 to the second transparent substrate 540, and configured to separate the first sensing electrodes 522 from the second sensing electrodes 552. From the front view of the capacitive touch panel 500, each partition region 580 having an appropriate size is arranged between a respective first sensing electrode 522 and a respective second sensing electrode 552 adjacent thereto.

The isolation layer 530 is made of OCA (Optically Clear Adhesive) or LOCA (Liquid Optically Clear Adhesive). In the fifth embodiment of the invention, each aforementioned ninth compensating electrode 560 is disposed in a respective first hollow region 524 corresponding to the position of the partition region 580. This design can solve the problem of the bad optical performance when the light is transmitted through the partition region 580.

Figure 13:
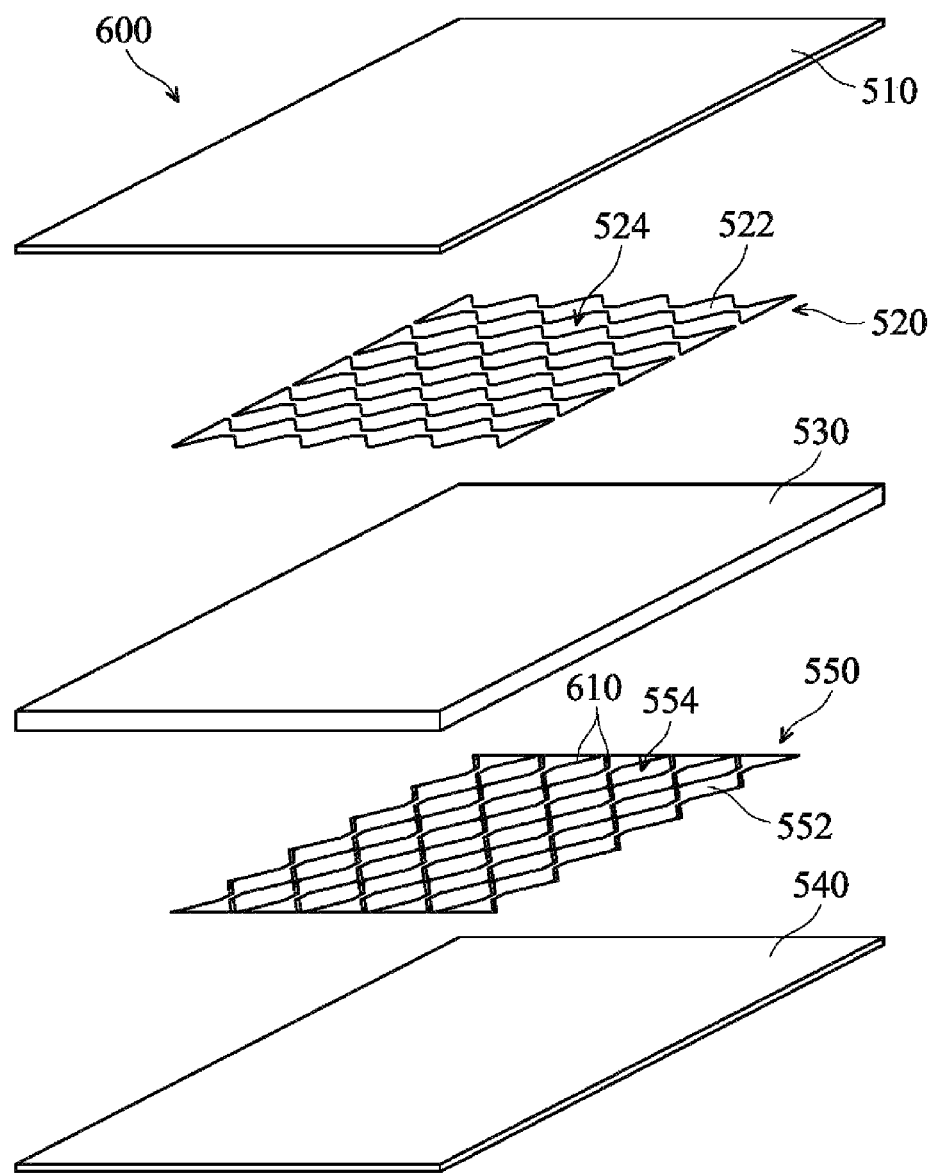
FIG. 13 is a diagram for illustrating an exploded view of a capacitive touch panel according to a sixth embodiment of the invention.
Figure 14:
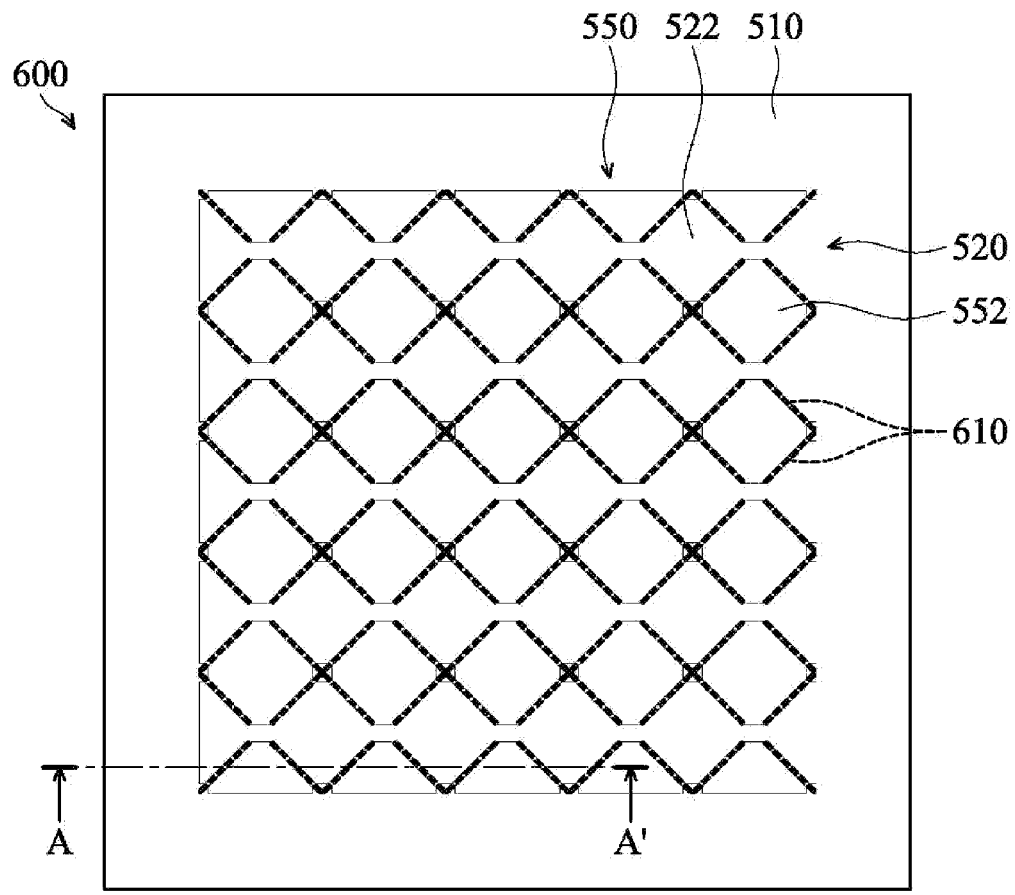
FIG. 14 is a diagram for illustrating a front view of a capacitive touch panel according to a sixth embodiment of the invention.
Figure 14A:
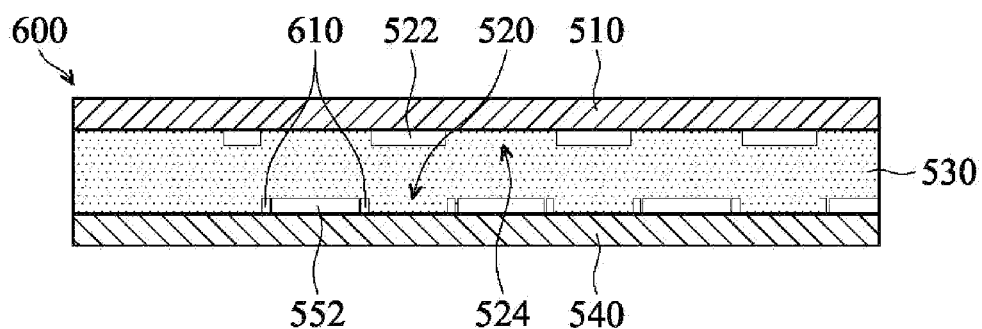
FIG. 14A is a diagram for illustrating a sectional view of a capacitive touch panel along the line AA' of FIG. 14.
Figure 14B:
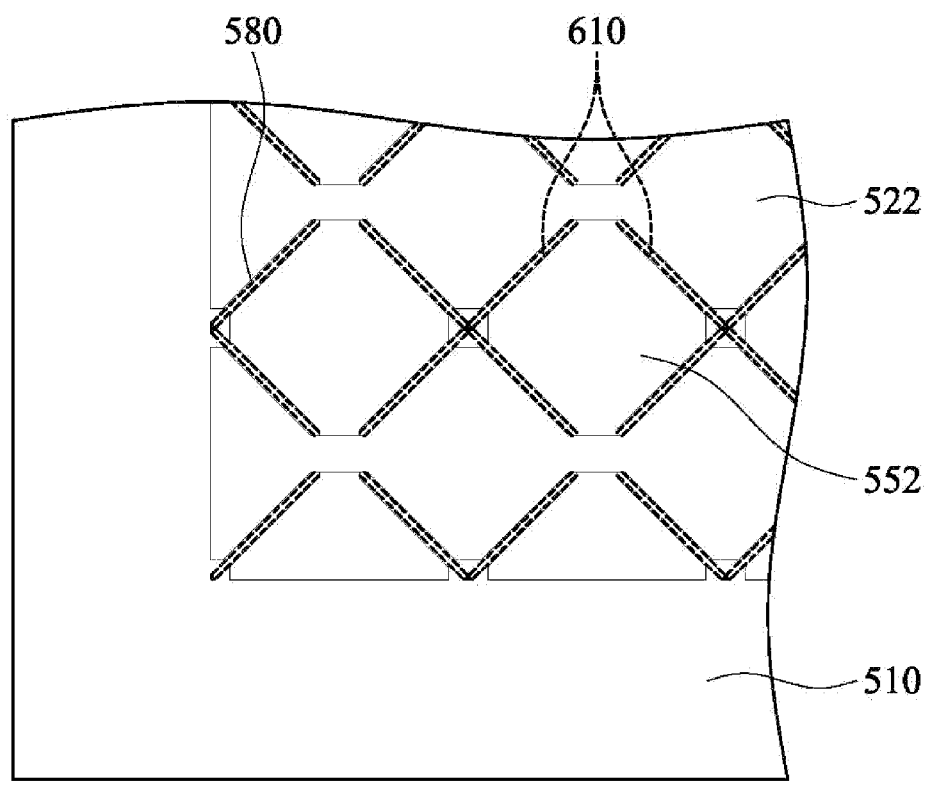
FIG. 14B is a diagram for illustrating an enlarged view of a portion of FIG. 14.

FIG. 13 is a diagram for illustrating an exploded view of a capacitive touch panel 600 according to a sixth embodiment of the invention. FIG. 14 is a diagram for illustrating a front view of the capacitive touch panel 600 according to the sixth embodiment of the invention. As shown in FIG. 13 and FIG. 14, in the sixth embodiment, the capacitive touch panel 600 also includes a first transparent panel 510, first sensing electrode serials 520, an isolation layer 530, a second transparent panel 540, and second sensing electrode serials 550. The main structure is substantially the same as that of the fifth embodiment. Please further refer to FIG. 14A and FIG. 14B. In the sixth embodiment of the invention, adjustments are made such that just each tenth compensating electrode 610 is formed in a respective second hollow region 554 on the surface of the second transparent substrate 540. The tenth compensating electrodes 610 are made of transparent conductive materials, such as ITO (Indium Tin Oxide), AZO (Aluminum-doped Zinc Oxide), IZO (Indium Zinc Oxide), nanosilver films, CNT (Carbon Nanotube), or graphene films. Preferably, the tenth compensating electrodes 610 may be made of the same transparent conductive materials as those of the corresponding second sensing electrodes 552. In this embodiment, when the second sensing electrode serials 550 are formed on the second transparent substrates 540 through a manufacturing process, the invented tenth compensating electrodes 610 may be also produced and disposed thereon through the same manufacturing process, and therefore the aforementioned process is simplified. Each appropriate gap is formed between a respective tenth compensating electrode 610 and a respective second sensing electrode 552. The isolation layer 530 is disposed between the first and second transparent substrates 510 and 540. The isolation layer 530 is configured to attach the first transparent substrate 510 to the second transparent substrate 540, and configured to separate the first sensing electrodes 522 from the second sensing electrodes 552. From the front view of the capacitive touch panel 600, each partition region 580 having an appropriate size is arranged between a respective first sensing electrode 522 and a respective second sensing electrode 552 adjacent thereto. The isolation layer 530 is made of OCA (Optically Clear Adhesive) or LOCA (Liquid Optically Clear Adhesive). In the sixth embodiment of the invention, each aforementioned tenth compensating electrode 610 is disposed in a respective second hollow region 554 corresponding to the position of the partition region 580.

Figure 15:
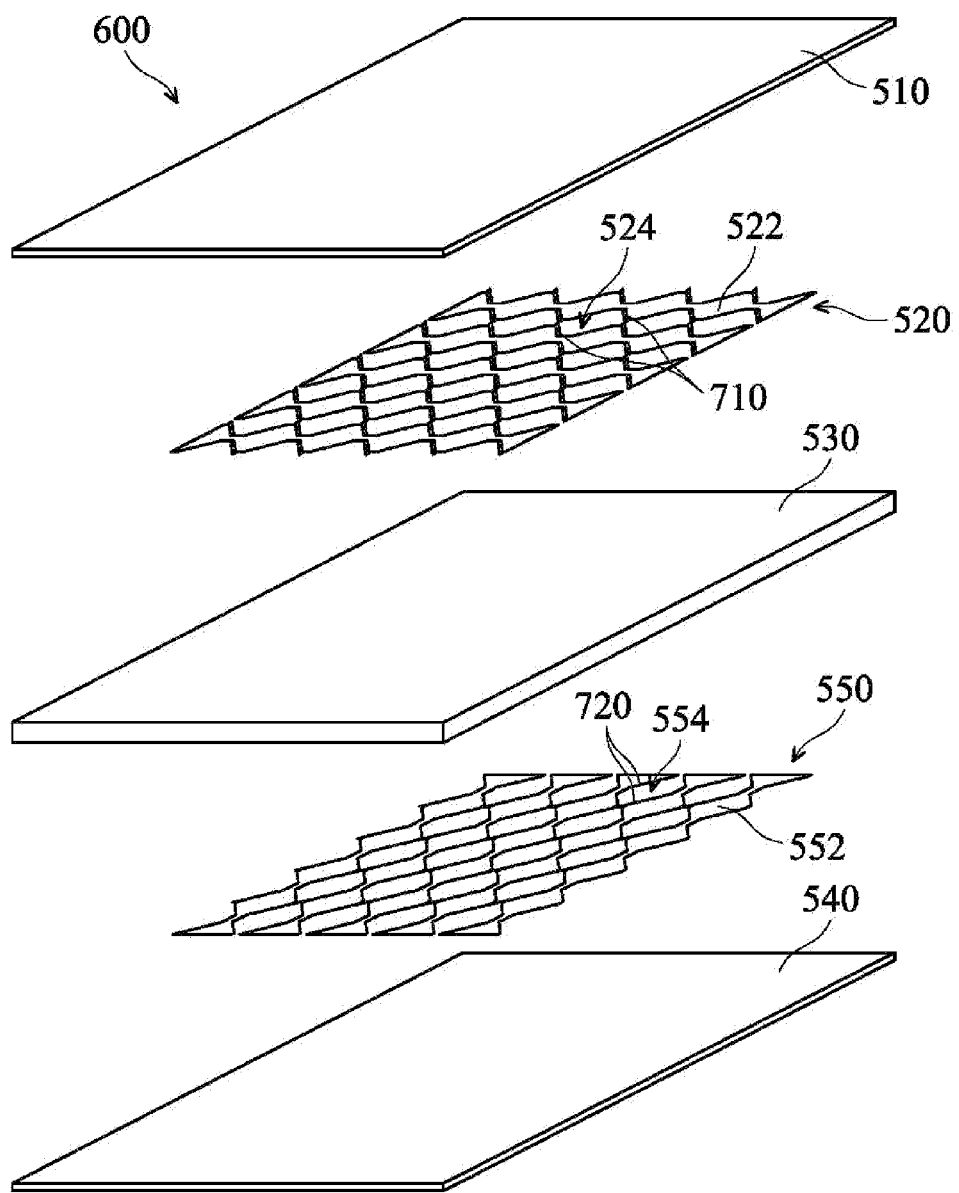
FIG. 15 is a diagram for illustrating an exploded view of a capacitive touch panel according to a seventh embodiment of the invention.
Figure 16:
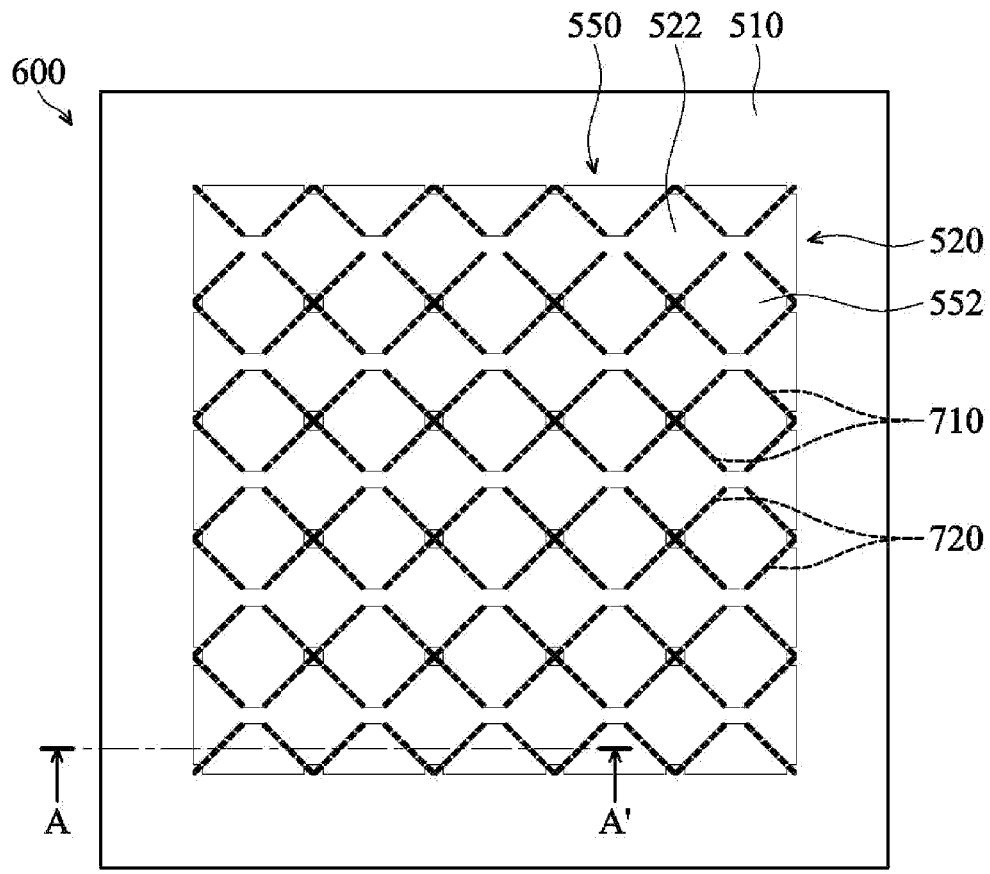
FIG. 16 is a diagram for illustrating a front view of a capacitive touch panel according to a seventh embodiment of the invention.
Figure 16A:
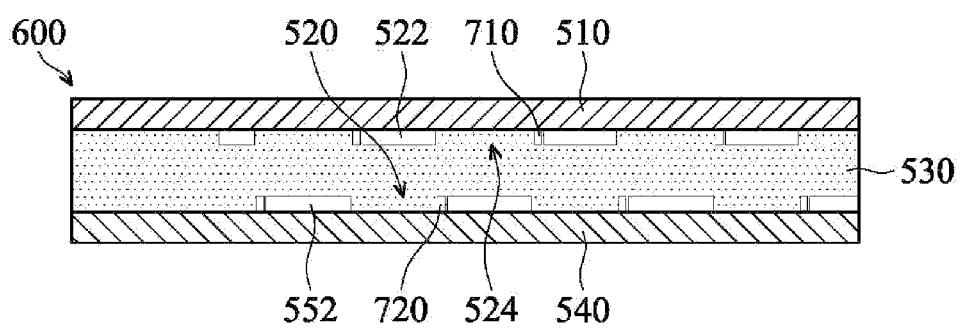
FIG. 16A is a diagram for illustrating a sectional view of a capacitive touch panel along the line AA' of FIG. 16.
Figure 16B:
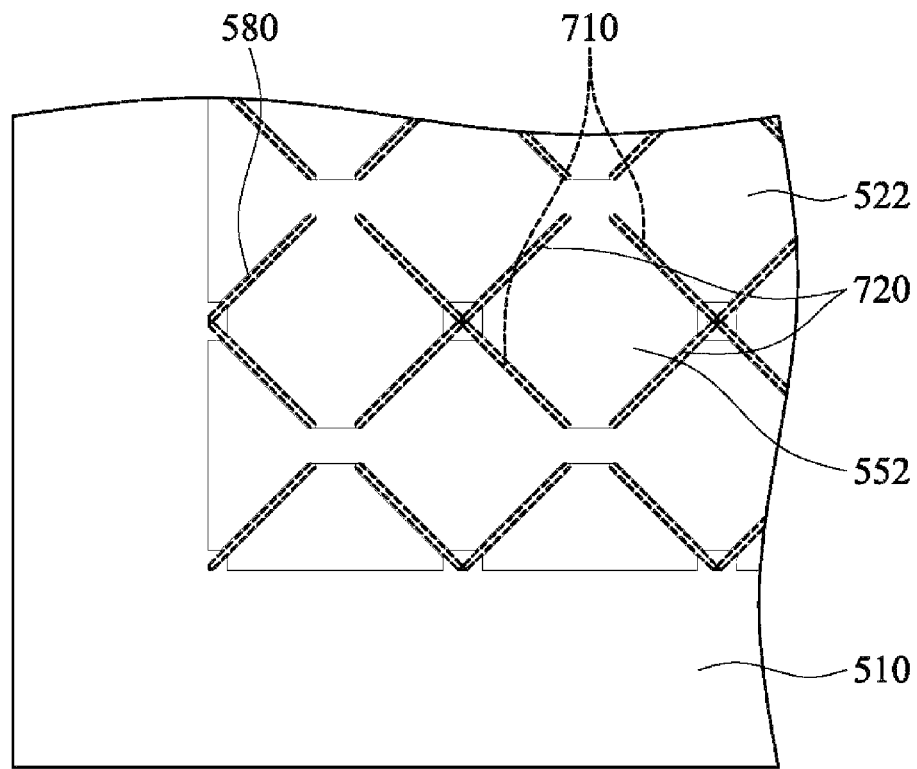
FIG. 16B is a diagram for illustrating an enlarged view of a portion of FIG. 16.

FIG. 15 is a diagram for illustrating an exploded view of a capacitive touch panel 700 according to a seventh embodiment of the invention. FIG. 16 is a diagram for illustrating a front view of the capacitive touch panel 700 according to the seventh embodiment of the invention. As shown in FIG. 15 and FIG. 16, in the seventh embodiment, the capacitive touch panel 700 also includes a first transparent panel 510, first sensing electrode serials 520, an isolation layer 530, a second transparent panel 540, and second sensing electrode serials 550. The main structure is substantially the same as that of the fifth or sixth embodiment. Please further refer to FIG. 16A and FIG. 16B. In the seventh embodiment of the invention, adjustments are made such that each eleventh compensating electrode 710 is formed in a respective first hollow region 524 on the surface of the first transparent substrate 510, and each twelfth compensating electrode 720 is formed in a respective second hollow region 554 on the surface of the second transparent substrate 540 The eleventh and twelfth compensating electrodes 710 and 720 are made of transparent conductive materials, such as ITO (Indium Tin Oxide), AZO (Aluminum-doped Zinc Oxide), IZO (Indium Zinc Oxide), nanosilver films, CNT (Carbon Nanotube), or graphene films. Preferably, the eleventh and twelfth compensating electrodes 710 and 720 may be made of the same transparent conductive materials as those of the corresponding first and second sensing electrodes 522 and 552, respectively. Each eleventh compensating electrode 710 is disposed adjacent to a corresponding edge of a respective first hollow region 524, and each twelfth compensating electrode 720 is disposed adjacent to another corresponding edge of a respective second hollow region 554. The eleventh and twelfth compensating electrodes 710 and 720 extend and are perpendicular to each other. From the front view of the capacitive touch panel 700, each partition region 580 having an appropriate size is arranged between a respective first sensing electrode 522 and a respective second sensing electrode 552 adjacent thereto. In the seventh embodiment of the invention, each aforementioned eleventh compensating electrode 710 is disposed in a respective first hollow region 524 corresponding to the position of the partition region 580, and each aforementioned twelfth compensating electrode 720 is disposed in a respective second hollow region 554 corresponding to the position of the partition region 580.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A capacitive touch panel, comprising:
   a first transparent substrate, wherein a plurality of first sensing electrode serials are disposed in a first direction on a surface of the first transparent substrate, the first sensing electrode serials are formed by cascading a plurality of first sensing electrodes, a first hollow region is formed between two adjacent first sensing electrodes, and a first compensating electrode is formed in the first hollow region on the surface of the first transparent substrate;
   a second transparent substrate, wherein a plurality of second sensing electrode serials are disposed in a second direction on a surface of the second transparent substrate, the second sensing electrode serials are formed by cascading a plurality of second sensing electrodes, a second hollow region is formed between two adjacent second sensing electrodes, the second direction is perpendicular to the first direction, a second compensating electrode is formed in the second hollow region on the surface of the second transparent substrate, and a partition region is arranged between the first sensing electrodes and the second sensing electrodes adjacent thereto; and
   an isolation layer, disposed between the first transparent substrate and the second transparent substrate, configured to attach the first transparent substrate to the second transparent substrate, and configured to separate the first sensing electrodes from the second sensing electrodes.

2. The capacitive touch panel as claimed in claim 1, wherein the areas of the first and second compensating electrodes are smaller than those of the corresponding second and first sensing electrodes, respectively.

3. The capacitive touch panel as claimed in claim 1, wherein the areas of the first and second compensating electrodes are larger than those of the corresponding second and first sensing electrodes, respectively.

4. The capacitive touch panel as claimed in claim 3, wherein the first compensating electrode partially overlaps with the second compensating electrode adjacent thereto in the partition region.

5. The capacitive touch panel as claimed in claim 3, wherein the first compensating electrode completely overlaps with the second compensating electrode adjacent thereto in the partition region.

6. The capacitive touch panel as claimed in claim 1, wherein the first compensating electrode is disposed in the first hollow region corresponding to the position of the partition region.

7. The capacitive touch panel as claimed in claim 1, wherein the second compensating electrode is disposed in the second hollow region corresponding to the position of the partition region.

8. The capacitive touch panel as claimed in claim 1, wherein the first compensating electrode is disposed adjacent to a corresponding edge of the first hollow region, the second compensating electrode is disposed adjacent to another corresponding edge of the second hollow region, and the first and second compensating electrodes extend and are perpendicular to each other.

9. The capacitive touch panel as claimed in claim 8, wherein the first and second compensating electrodes are disposed in the first and second hollow regions corresponding to the position of the partition region, respectively.

10. A capacitive touch panel, comprising:
a first transparent substrate, wherein a plurality of first sensing electrode serials are disposed in a first direction on a surface of the first transparent substrate, the first sensing electrode serials are formed by cascading a plurality of first sensing electrodes, a first hollow region is formed between two adjacent first sensing electrodes, and a first compensating electrode is formed in the first hollow region on the surface of the first transparent substrate;
a second transparent substrate, wherein a plurality of second sensing electrode serials are disposed in a second direction on a surface of the second transparent substrate, the second sensing electrode serials are formed by cascading a plurality of second sensing electrodes, a second hollow region is formed between two adjacent second sensing electrodes, the second direction is perpendicular to the first direction, and a partition region is arranged between the first sensing electrodes and the second sensing electrodes adjacent thereto; and
an isolation layer, disposed between the first transparent substrate and the second transparent substrate, configured to attach the first transparent substrate to the second transparent substrate, and configured to separate the first sensing electrodes from the second sensing electrodes.

11. The capacitive touch panel as claimed in claim 10, wherein the first compensating electrode is disposed in the first hollow region corresponding to the position of the partition region.

12. A capacitive touch panel, comprising:
a first transparent substrate, wherein a plurality of first sensing electrode serials are disposed in a first direction on a surface of the first transparent substrate, the first sensing electrode serials are formed by cascading a plurality of first sensing electrodes, and a first hollow region is formed between two adjacent first sensing electrodes;
a second transparent substrate, wherein a plurality of second sensing electrode serials are disposed in a second direction on a surface of the second transparent substrate, the second sensing electrode serials are formed by cascading a plurality of second sensing electrodes, a second hollow region is formed between two adjacent second sensing electrodes, a second compensating electrode is formed in the second hollow region on the surface of the second transparent substrate, the second direction is perpendicular to the first direction, and a partition region is arranged between the first sensing electrodes and the second sensing electrodes adjacent thereto; and
an isolation layer, disposed between the first transparent substrate and the second transparent substrate, configured to attach the first transparent substrate to the second transparent substrate, and configured to separate the first sensing electrodes from the second sensing electrodes.

13. The capacitive touch panel as claimed in claim 12, wherein the second compensating electrode is disposed in the second hollow region corresponding to the position of the partition region.

* * * * *